US012690576B2

(12) United States Patent (10) Patent No.: US 12,690,576 B2
Omura (45) Date of Patent: Jul. 28, 2026

(54) REEL SEAT AND FISHING ROD INCLUDING SAME

(71) Applicant: FUJI KOGYO CO., LTD., Shizuoka (JP)

(72) Inventor: Kazuhito Omura, Shizuoka (JP)

(73) Assignee: FUJI KOGYO CO., LTD., Shizuoka (JP)

( * ) Notice: Subject to any disclaimer, the term of this patent is extended or adjusted under 35 U.S.C. 154(b) by 0 days.

(21) Appl. No.: 18/962,433

(22) Filed: Nov. 27, 2024

(65) Prior Publication Data

US 2025/0176517 A1 Jun. 5, 2025

(30) Foreign Application Priority Data

Dec. 4, 2023 (KR) ......................... 10-2023-0173290
Jun. 24, 2024 (KR) ......................... 10-2024-0081785

(51) Int. Cl.
*A01K 87/06* (2006.01)
*A01K 87/08* (2006.01)

(52) U.S. Cl.
CPC .............. *A01K 87/06* (2013.01); *A01K 87/08* (2013.01)

(58) Field of Classification Search
CPC .... A01K 87/06; A01K 87/008; A01K 87/009; A01K 87/08
See application file for complete search history.

(56) References Cited

U.S. PATENT DOCUMENTS

| | | | | |
|---|---|---|---|---|
| 4,516,351 | A | * | 5/1985 | Highby ................... A01K 87/06 43/18.1 R |
| 4,653,217 | A | * | 3/1987 | Ohmura ................. A01K 87/06 43/22 |
| 4,918,852 | A | * | 4/1990 | Yamato ................... A01K 87/06 43/25 |
| 5,199,207 | A | * | 4/1993 | Nakagawa ............. A01K 87/06 43/22 |
| 5,222,319 | A | * | 6/1993 | Yamato ................. A01K 87/06 43/22 |
| 5,291,684 | A | * | 3/1994 | Oyama ................... A01K 87/08 43/22 |
| 6,848,209 | B2 | | 2/2005 | Ohmura |

(Continued)

FOREIGN PATENT DOCUMENTS

| | | |
|---|---|---|
| JP | 60-241834 A | 11/1985 |
| JP | 3866509 B2 | 1/2007 |

(Continued)

*Primary Examiner* — Katelyn T Truong
(74) *Attorney, Agent, or Firm* — Oblon, McClelland, Maier & Neustadt, L.L.P.

(57) ABSTRACT

A reel seat for mounting a fishing reel to a rod body, and a fishing rod including the reel seat are provided. The reel seat includes a seat body coupled to the rod body. The seat body includes a gripping portion gripped by angler's fingers, and a trigger portion protruding downward in the gripping portion. A portion of the gripping portion gripped by a ring finger is inclined at a first inclination angle obliquely downward with respect to a central axis of the seat body. A portion of the gripping portion gripped by a little finger forms a front surface of the trigger portion, and is inclined at a second inclination anger greater than the first inclination angle obliquely downward with respect to the central axis.

16 Claims, 13 Drawing Sheets

(56) References Cited

U.S. PATENT DOCUMENTS

| | | | | |
|---|---|---|---|---|
| 2015/0040463 | A1* | 2/2015 | Lin | A01K 87/06 |
| | | | | 43/22 |
| 2016/0192628 | A1 | 7/2016 | Omura | |
| 2020/0037590 | A1* | 2/2020 | Taniguchi | A01K 97/10 |

FOREIGN PATENT DOCUMENTS

| | | | | | |
|---|---|---|---|---|---|
| JP | 1495269 | S | | 4/2014 | |
| JP | 2019-140943 | A | | 8/2018 | |
| JP | 2019-146504 | A | | 9/2019 | |
| JP | 2020-120593 | A | | 8/2020 | |
| JP | 2020-127414 | A | | 8/2020 | |
| JP | 2021-10385 | A | | 2/2021 | |
| JP | 2021010362 | A | * | 2/2021 | |
| JP | 7067953 | B2 | | 5/2022 | |
| KR | 20000020850 | U | * | 12/2000 | A01K 87/08 |
| KR | 10-2150338 | B1 | | 9/2020 | |
| KR | 10-2150347 | B1 | | 9/2020 | |
| WO | WO-2015/037471 | A1 | | 3/2015 | |

* cited by examiner

REEL SEAT AND FISHING ROD INCLUDING SAME

CROSS-REFERENCE TO RELATED APPLICATION

This application is based upon and claims the benefit of priority from Korean Patent Application No. 10-2023-0173290, filed on Dec. 4, 2023, and Korean Patent Application No. 10-2024-0081785, filed on Jun. 24, 2024, the entire contents of which are incorporated herein by reference.

TECHNICAL FIELD

The present disclosure relates to a reel seat for fixing a fishing reel, and to a fishing rod including such a reel seat.

BACKGROUND

In fishing using a reel, a reel seat for mounting the reel to a rod body of a fishing rod is coupled to the rod body. The reel is detachably fixed to the reel seat. As one example of the reel, a spinning reel is fixed to a lower side of the reel seat. As another example of the reel, a double axis reel or a bait casting reel is fixed to an upper side of the reel seat. By way of example, the double axis reel may be used for a fishing method referred to as vertical jigging. In fishing of the vertical jigging, an angler drops a jig (one form of a lure) vertically into the water from a boat, and releases or winds the reel while moving the jig by up-and-down movements of the fishing rod.

In fishing using the reel, the angler can perform a retrieving motion. The retrieving motion means a motion of the angler turning a handle of the reel with one hand such that the reel winds a fishing line. Further, when the angler performs the retrieving motion, the angler can perform a palming motion. The palming motion means a motion of the angler wrapping and gripping the reel and the reel seat with a palm and fingers of the other hand. In a state where the angler stably grips the reel seat through the palming motion without shaking the fishing rod, the angler moves the jig by the up-and-down movements of the fishing rod, and can perform a hooking motion of hooking a fish on a fishing hook. Therefore, in fishing using the double axis reel, the palming motion is an essential and unique gripping motion of the angler.

In order for the angler to perform the palming motion without shaking the fishing rod, the angler maintains a tension state in the hand gripping the reel and reel seat. Therefore, if the angler performs the palming motion for a long time, pain may occur in the fingers gripping the reel seat, and a stability of a grip form for the palming motion may decrease.

In general, when the angler performs the palming motion, the angler grips the reel seat with four fingers except a thumb. In particular, the angler grips the reel seat with four fingers in a state where the four fingers are in close contact with one another. In the palming motion performed for a long time, pain may occur in a first joint and a second join of a finger. Therefore, the angler needs to perform the palming motion by a grip form that alleviates the tension and pain.

In the fishing method of the vertical jigging, the angler may move the jig by turning an elbow and a shoulder in a state where the angler lowers a tip portion of the fishing rod and fixes a wrist. At this time, in order to move the jig (so-called jigging action), the angler may perform a motion of raising or lowering the tip portion of the fishing rod by means of snapping of the wrist. The angler needs to rapidly change a gripping position of a finger in the grip form of the palming motion in order to smoothly move the wrist from a wrist-fixed state for the jigging action, and to stably maintain the grip form after changing the gripping position.

Accordingly, there is a need for a reel seat, which can alleviate the tension and pain applied to the fingers during the palming motion performed for a long time, and can stably maintain the grip form of the palming motion for the jigging action.

SUMMARY

Disclosed embodiments provide a reel seat that solves at least one or more of the aforementioned problems of the prior art technique. At least one embodiment of the present disclosure provides a reel seat, which does not cause tension and pain in a finger and provides a long-term and excellent use feel to an angler. At least one embodiment of the present disclosure provides a reel seat, which realizes a rapid change of a gripping position of a finger and a stable grip form after the change of the gripping position.

The disclosed embodiments relate to a reel seat for mounting a fishing reel to a rod body of a fishing rod. The reel seat according to one embodiment includes a seat body and a movable hood. The seat body includes a bore formed in an axial direction of the rod body and coupled to the rod body, a seating portion on which the fishing reel is seated, a gripping portion located below the seating portion, and a trigger portion protruding downward in the gripping portion. The movable hood is coupled to the seat body so as to be movable along a central axis of the bore and fixes the fishing reel to the seating portion.

The gripping portion includes a first gripping surface portion, a second gripping surface portion, a third gripping surface portion, and a fourth gripping surface portion. The first gripping surface portion is configured to be gripped by an index finger. The second gripping surface portion extends rearward from the first gripping surface portion. The third gripping surface portion extends from the second gripping surface portion to the trigger portion so as to be inclined obliquely downward with respect to the central axis. The fourth gripping surface portion extends rearward from the third gripping surface portion so as to be inclined downward with respect to the central axis further obliquely than the third gripping surface portion, and forms a front surface of the trigger portion. In a side view of the seat body, the third gripping surface portion has a first inclined front end contour line, and the fourth gripping surface portion has a second inclined front end contour line. The first inclined front end contour line is inclined at a first inclination angle with respect to the central axis. The second inclined front end contour line is inclined with respect to the central axis at a second inclination angle greater than the first inclination angle, and connects with the first inclined front end contour line.

In one embodiment, the gripping portion includes a trigger boundary portion, which is formed between the third gripping surface portion and the fourth gripping surface portion and is inclined with respect to the central axis. The gripping portion is angularly bent through the trigger boundary portion such that the third gripping surface portion and the fourth gripping surface portion are divided from each other.

In one embodiment, in the side view of the seat body, the first inclined front end contour line and the second inclined front end contour line are inclined with respect to each other so as to form an included angle centered on a conjunction point of the third gripping surface portion and the fourth gripping surface portion.

In one embodiment, the first inclination angle is in a range of 20 degrees to 30 degrees downward from the central axis, and the second inclination angle is in a range of 55 degrees to 70 degrees downward from the central axis.

In one embodiment, the first inclined front end contour line is formed as a straight line having a length in a range of 12 mm to 20 mm.

In one embodiment, the gripping portion includes a fifth gripping surface portion located between the trigger portion and a rear end of the seat body. The fifth gripping surface portion is configured to be gripped by a little finger moved from the fourth gripping surface portion. In the side view of the seat body, the fifth gripping surface portion has a fourth lower end contour line formed as a straight line.

In one embodiment, the fourth lower end contour line of the fifth gripping surface portion is formed as a straight line having a length in a range of 10 mm to 18 mm.

In one embodiment, a first vertical distance between the central axis and a conjunction point of the first inclined front end contour line and the second inclined front end contour line is greater than a second vertical distance between the fourth lower end contour line and the central axis. Further, the second vertical distance is greater than a third vertical distance between the central axis and a third lower end contour line of the second gripping surface portion.

In one embodiment, the trigger portion includes a catching lower end portion connecting with the fourth gripping surface portion. The catching lower end portion is inclined with respect to the central axis at an inclination angle greater than the second inclination angle so as to support a little finger.

In one embodiment, in the side view of the seat body, the catching lower end portion has a vertical front end contour line perpendicular to the central axis and connecting with the second inclined front end contour line. In a front view of the seat body, the catching lower end portion has a shape of an inverted triangle.

In one embodiment, the second gripping surface portion includes a bite signal delivering portion and a bite signal boundary portion. The bite signal delivering portion is configured to deliver a bite signal to a middle finger. The bite signal delivering portion is formed such that the seat body has a thickness less than both a thickness at the first gripping surface portion and a thickness at the third gripping surface portion. The bite signal boundary portion surrounds the bite signal delivering portion, and divides the bite signal delivering portion from the first gripping surface portion and the third gripping surface portion.

In one embodiment, in the side view of the seat body, the bite signal delivering portion has a third lower end contour line formed as a straight line. Further, in a cross-sectional view of the seat body, the bite signal delivering portion has an outer peripheral contour line becoming a portion of a circumference line of an imaginary circle. The imaginary circle is located concentrically with an imaginary inscribed circle inscribed in the bore and has a radius greater than a radius of the imaginary inscribed circle.

In one embodiment, the seat body has, at the bite signal delivering portion, a thickness in a range of 0.3 mm to 1.0 mm.

In one embodiment, the seat body includes a cylindrical end portion coupled to the movable hood, and the cylindrical end portion extends from the seating portion and the first gripping surface portion along the central axis. The first gripping surface portion includes a protruding surface portion and a bulging surface portion. The protruding surface portion is located below the central axis, and protrudes in a radially outward direction of the central axis with respect to the cylindrical end portion. The bulging surface portion extends rearward from the protruding surface portion, and bulges in the radially outward direction. The movable hood includes a movable hood portion and an accommodating portion. The movable hood portion is moved alongside an upper end edge of the protruding surface portion to be positioned above the protruding surface portion, and fixes a portion of the fishing reel to the seating portion. The accommodating portion is formed as a space located below the movable hood portion, and accommodates the protruding surface portion.

In one embodiment, in the side view of the seat body, the protruding surface portion of the first gripping surface portion has a first lower end contour line, the bulging surface portion of the first gripping surface portion has a second lower end contour line, and the second gripping surface portion has a third lower end contour line. The first lower end contour line is arcuately curved concavely with respect to the central axis. The second lower end contour line connects with the first lower end contour line, and is arcuately curved convexly with respect to the central axis. The third lower end contour line connects with the second lower end contour line, and is formed as a straight line.

Further, the disclosed embodiments relate to a fishing rod including the reel seat. The fishing rod according to one embodiment includes a rod body, and the reel seat according to the above-described embodiment, which is coupled to the rod body.

According to at least one embodiment of the present disclosure, the gripping portion of the seat body has the first to fourth gripping surface portions providing a gripping range to each of the index finger, the middle finger, the ring finger, and the little finger, and can allow the ring finger to grip the third gripping surface portion in a lightly bent state of a wrist. Accordingly, an angler can take a grip form for a palming motion in the state where tension and pain do not exist in the finger.

According to at least one embodiment of the present disclosure, the third gripping surface portion of the gripping portion divides a gripping range of the ring finger from a gripping range of the middle finger and a gripping range of the little finger, and limits the same in the gripping portion. Accordingly, the grip form for the palming motion can be maintained by the ring finger. Further, the grip form for the palming motion does not collapse and can be stably maintained, in both an example where the gripping portion is gripped in a close contact state of the middle finger and the ring finger and an example where the gripping portion is gripped in a state where a space is formed between middle finger and the ring finger.

According to at least one embodiment of the present disclosure, the third gripping surface portion of the gripping portion is inclined with respect to the central axis of the seat body, the fourth gripping surface portion of the gripping portion is further inclined with respect to the central axis than the third gripping surface portion, and the fifth gripping surface portion of the gripping portion is located in rear of the trigger portion. Accordingly, the gripping range of the ring finger and the gripping range of the little finger can be clearly distinguished at the trigger portion. Further, after the gripping position of the little finger is changed to the fifth gripping surface portion, the third gripping surface portion can be stably gripped by the ring finger, and the grip form for the palming motion can be stably maintained together with a positional change of the little finger. Further, immediately after the little finger is moved to the fifth gripping surface portion, the ring finger can be supported by the fourth gripping surface portion, and the movement of a wrist for a jigging action can be made smoothly from a wrist-fixed state.

According to at least one embodiment of the present disclosure, the fourth gripping surface portion of the gripping portion is inclined with respect to the central axis of the seat body at an inclination angle greater than the inclination angle of the third gripping surface portion. Further, the catching lower end portion of the trigger portion connects with the fourth gripping surface portion, is inclined at the inclination angle greater than the inclination angle of the fourth gripping surface portion, and is formed in a shape of an inverted triangle. Accordingly, the catching lower end portion can prevent the little finger from slipping and falling from the fourth gripping surface portion, and can allow the little finger to smoothly move from the fourth gripping surface portion to the fifth gripping surface portion.

According to at least one embodiment of the present disclosure, the second gripping surface portion of the gripping portion has the bite signal delivering portion, which forms a thickness thinner than a thickness at the first and third gripping surface portions. The bite signal delivering portion of the second gripping surface portion can surely deliver the bite signal to the middle finger with a high sensitivity in a state where the index finger and the middle finger softly grip the seat body.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Figure 1:
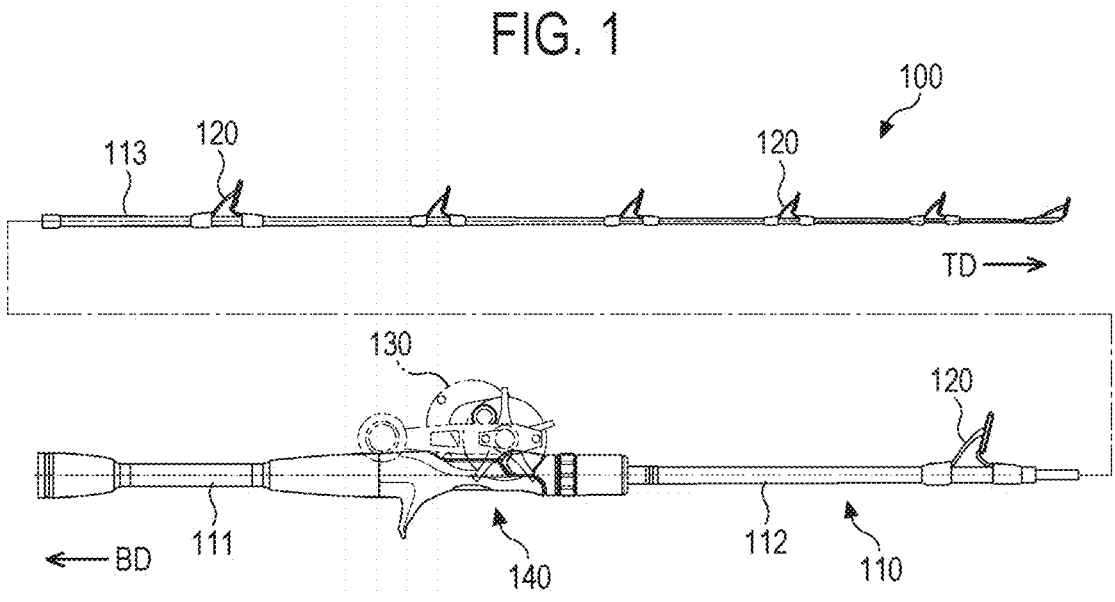
FIG. 1 is a side view showing a fishing rod according to one embodiment, which includes a reel seat according to one embodiment.

Embodiments of the present disclosure are illustrated for the purpose of explaining the technical idea of the present disclosure. The scope of the rights according to the present disclosure is not limited to the embodiments presented below or the detailed descriptions of such embodiments.

All technical terms and scientific terms used in the present disclosure include meanings that are commonly understood by those of ordinary skill in the technical field to which the present disclosure pertains unless otherwise defined. All terms used in the present disclosure are selected for the purpose of describing the present disclosure more clearly, and are not selected to limit the scope of the rights according to the present disclosure.

Expressions such as "comprising," "including," "having," and the like used in the present disclosure are to be understood as open-ended terms having the possibility of encompassing other embodiments, unless otherwise mentioned in the phrase or sentence containing such expressions.

Singular expressions described in the present disclosure may encompass plural expressions unless otherwise stated, which will also apply to singular expressions recited in the claims.

Expressions such as "first," "second," etc. used in the present disclosure are used to distinguish a plurality of elements from one another, and are not intended to limit an order or importance of the elements.

In the present disclosure, the description that one element is "connected" or "coupled" to another element should be understood to indicate that the aforesaid one element may be directly connected or coupled to the aforesaid another element, and should be further understood that the aforesaid one element may be connected or coupled to the aforesaid another element via a new element.

Dimensional and numerical values described in the present disclosure are not limited only to the dimensional and numerical values that are described herein. Unless specified otherwise, the dimensional and numerical values may be understood to mean the described values and equivalent ranges including the values.

The directional term "frontward" used in the present disclosure means a direction directed toward a tip of a fishing rod, while the directional term "rearward" means a direction directed toward a butt of a fishing rod. For example, in FIG. 1, an arrow of a frontward direction TD indicates the frontward direction directed toward a tip of a fishing rod, while an arrow of a rearward direction BD indicates the rearward direction directed toward a butt of the fishing rod. The directional term "upward" and the directional term "downward" used in the present disclosure are based on an upward side and a downward side in the accompanying drawings.

Hereinafter, the embodiments of the present disclosure are described with reference to the accompanying drawings. Like reference numerals in the accompanying drawings denote like or corresponding elements. Further, in the following description of the embodiments, redundant descriptions for the same or corresponding elements may be omitted. However, even if the descriptions of the elements are omitted, such elements are not intended to be excluded in any embodiment.

Figure 2:
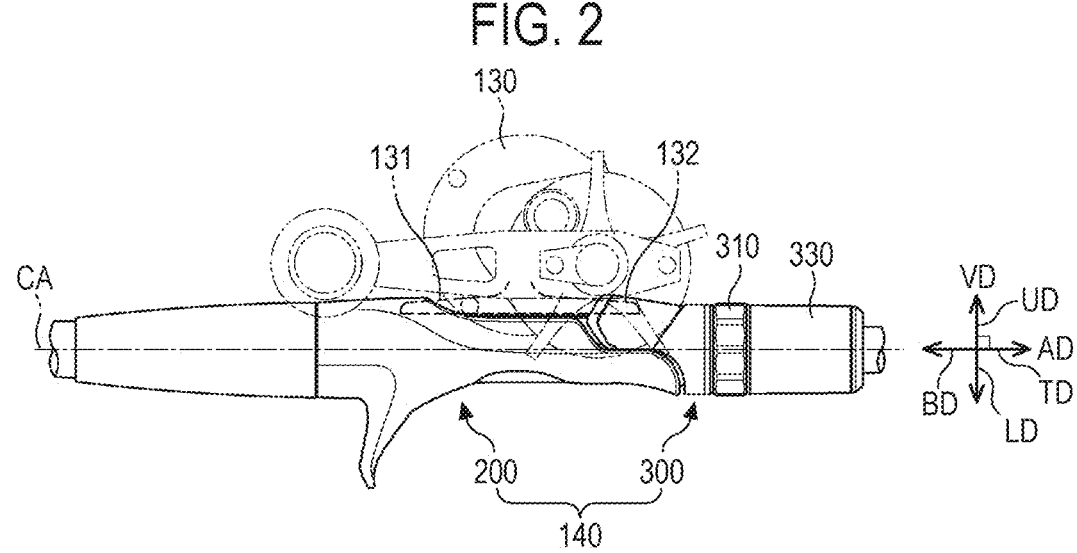
FIG. 2 is an enlarged side view of the fishing rod shown in FIG. 1.

FIG. 1 is a side view showing a fishing rod according to one embodiment, which includes a reel seat according to one embodiment. FIG. 2 is an enlarged side view of the fishing rod shown in FIG. 1. Reference is made to FIGS. 1 and 2.

A fishing rod 100 includes a rod body 110. The rod body 110 has a thin and long shape, and can elastically deform during fishing. The rod body may be a pipe-shaped part or a cylindrical column-shaped part. The fishing rod may include a single rod body or a plurality of rod bodies.

The fishing rod 100 shown in FIG. 1 includes a first rod body 111, a second rod body 112, and a third rod body 113. The first rod body 111 may be referred to as a base rod body, and forms a butt side portion of the fishing rod. The second rod body 112 and the third rod body 113 may be connected in such a way that a rear end portion of the third rod body 113 is fitted to a front end portion of the second rod body 112. As another example, the fishing rod may include a plurality of rod bodies connected in a telescopic manner.

The fishing rod 100 may include a plurality of fishing line guides 120. The plurality of fishing line guides 120 are attached to the second rod body 112 and the third rod body 113. The fishing line guide 120 may include a guide ring through which a fishing line can pass, and a frame supporting the guide ring and attached to the rod body. The fishing line guide 120 guides a fishing line by the guide ring. When dropping a lure vertically into the water from a boat, or casting a lure, a fishing line is reeled out from a fishing reel 130 (hereinafter simply referred to as a "reel"). When landing a fish, the fishing line is wound onto the reel 130.

The fishing rod 100 includes a reel seat 140 for mounting the reel 130 to the rod body 110 according to one embodiment. The reel seat 140 may be coupled to a rear end portion of the second rod body 112, and a front end portion of the first rod body 111 may be coupled to a rear end portion of the reel seat 140. The reel seat 140 fixes and supports the reel 130. An angler can manipulate the reel 130 with one hand in a state where the angler grips the reel seat 140 with the other hand.

In the fishing rod of one embodiment, the reel 130 may be a so-called double axis reel or a so-called bait casting reel. In the double axis reel, a rotary shaft of a spool for winding the fishing line is disposed so as to be orthogonal to the rod body, and the rotary shaft is supported at both sides thereof. The reel 130 is detachably coupled to an upper side of the reel seat 140.

The reel 130 has a first leg 131 and a second leg 132, which extend in opposite directions. The first and second legs 131 and 132 are parts that are fixed to the reel seat 140. In an example shown in FIG. 2, the first leg 131 extends in the rearward direction BD, and the second leg 132 extends in the frontward direction TD. As the reel seat 140 releasably fixes the first leg 131 and the second leg 132, the reel 130 can be detachably coupled to the reel seat 140.

The reel seat 140 includes a seat body 200 that functions as a main body of the reel seat. An angler may grip the seat body 200. The reel 130 is seated on an upper side of the seat body 200, and a portion of the reel 130 (e.g., the first leg 131) is fixed to the seat body. The reel seat 140 includes a movable hood 300 fixing a portion of the reel 130 (e.g., the second leg 132) to the seat body 200. The movable hood 300 is movably coupled to the seat body 200.

Figure 3:
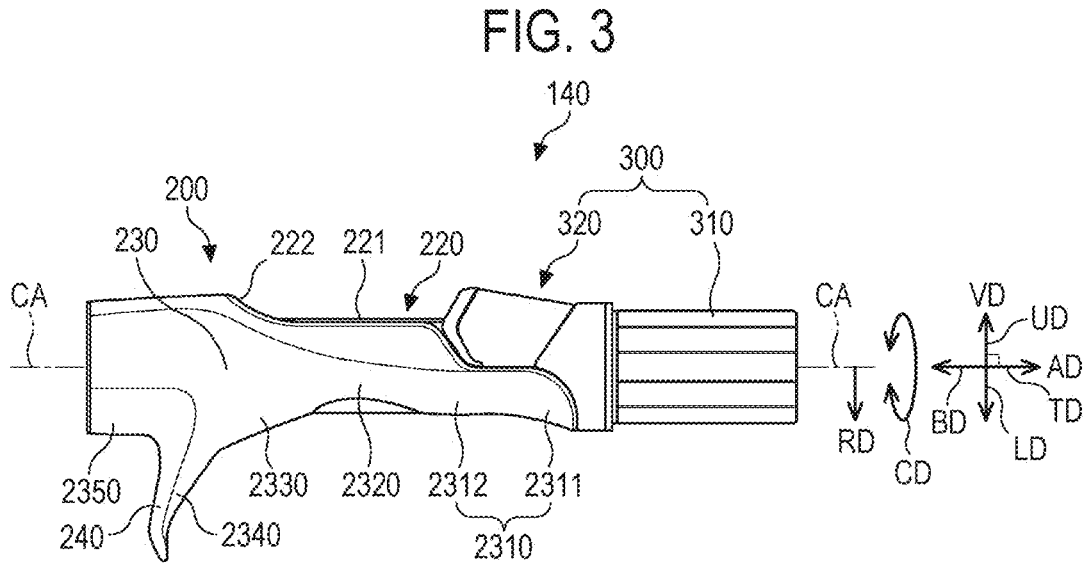
FIG. 3 is a side view showing a reel seat according to one embodiment.
Figure 4:
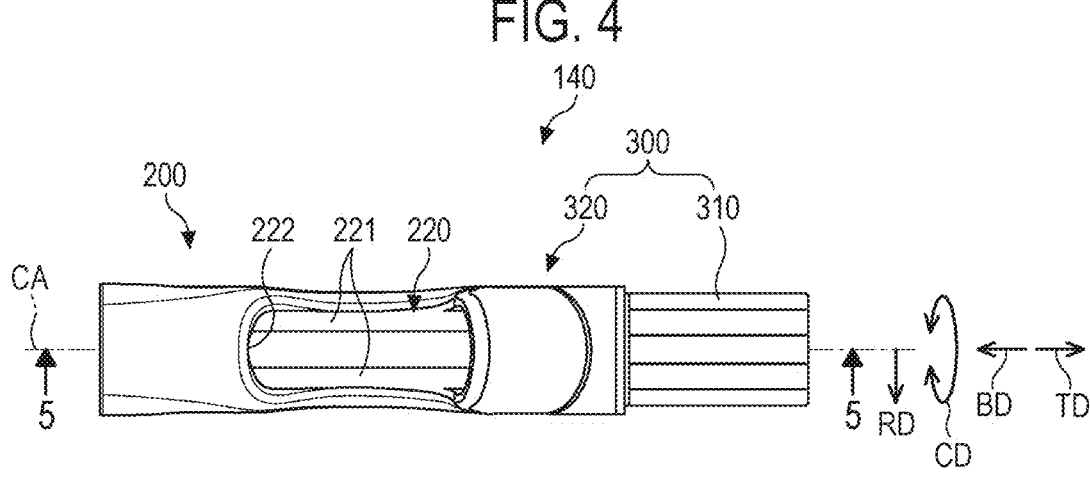
FIG. 4 is a top view of the reel seat shown in FIG. 3.
Figures 5, 6:
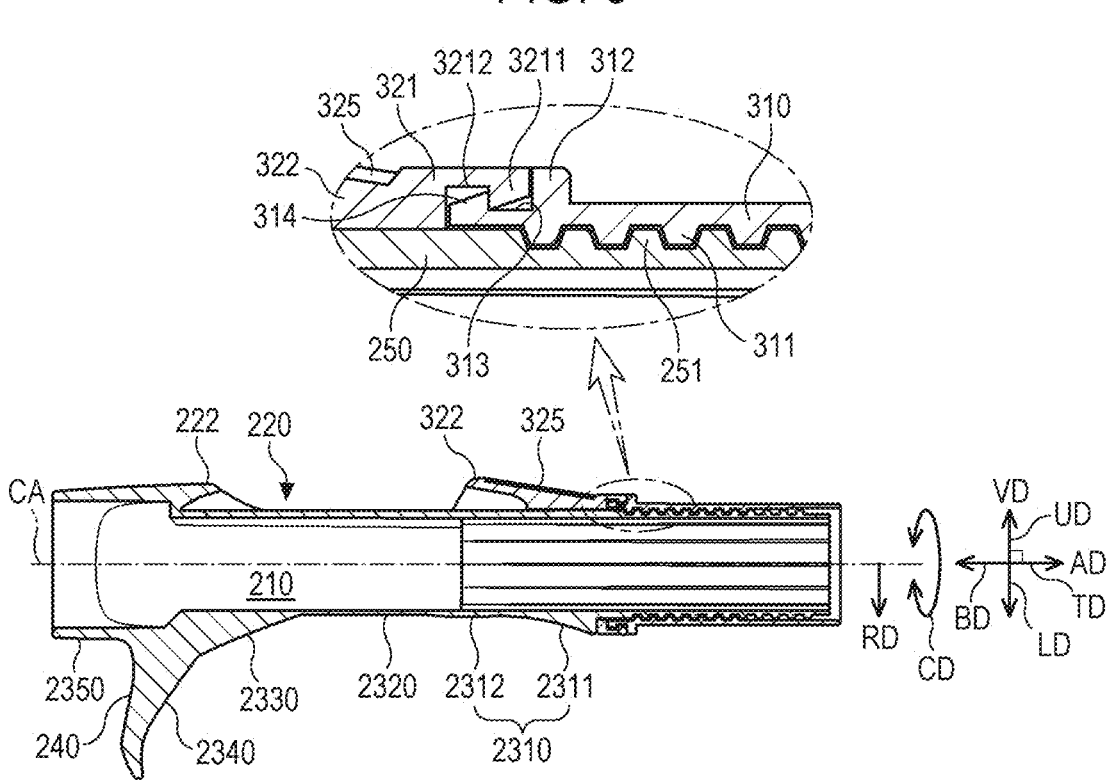
FIG. 5 is a cross-sectional view taken along line 5-5 of FIG. 4.
FIG. 6 is an exploded side view of the reel seat shown in FIG. 3.

FIG. 3 is a side view showing a reel seat according to one embodiment. FIG. 4 is a top view of the reel seat shown in FIG. 3. FIG. 5 is a cross-sectional view taken along line 5-5 of FIG. 4. Reference is made to FIGS. 3 to 5.

In the reel seat 140 according to one embodiment, the seat body 200 has a pipe shape. The seat body 200 functions to be coupled to the rod body of the fishing rod (e.g., the first rod body and the second rod body shown in FIG. 1), and functions to fix and support a reel (e.g., the reel shown in FIG. 1). A portion of the seat body 200 may be gripped by angler's fingers, and a portion of the seat body 200, which is not gripped, may be coupled to the movable hood 300.

The seat body 200 having a pipe shape has a bore 210 that is formed in the seat body in an axial direction AD of the rod body or in a longitudinal direction of the seat body. In this regard, the axial direction AD of the rod body means a direction extending through a center of a circular cross-sectional shape of the rod body in a longitudinal direction of the rod body. The bore 210 can be coupled to the rod body of the fishing rod (e.g., the first rod body and the second rod body shown in FIG. 1).

The bore 210 is formed to be penetrated through the seat body 200 between front and rear ends of the seat body in the axial direction AD of the rod body. Alternatively, the bore 210 may be formed to be penetrated through a portion of the seat body 200. The bore 210 has a substantially circular cross-sectional shape and defines a central axis CA. The central axis CA of the bore means an imaginary axis extending through a center of a cross-sectional shape of the bore 210 in the longitudinal direction of the seat body, and may be a central axis of the seat body. A surface of the bore 210 may have a plurality of grooves formed along the central axis CA.

The rod body of the fishing rod may be inserted and fitted into the bore 210. By way of example, the rear end portion of the second rod body 112 shown in FIG. 1 may be inserted and fitted into the bore 210 from a front end of the seat body along the central axis CA. Further, by way of example, the front end portion of the first rod body 111 shown in FIG. 1 may be inserted and fitted into the bore 210 from a rear end of the seat body along the central axis CA. Therefore, the reel seat 140 is coupled to the first rod body and the second rod body inserted into the bore 210. An adhesive is applied to the surface of the bore 210 and outer peripheral surfaces of the rod bodies, whereby the reel seat 140 and the rod bodies can be coupled by adhesion.

The seat body 200 supports the reel on the upper side thereof. The seat body 200 has a seating portion 220 on which the reel is seated. By way of example, the first and second legs of the reel shown in FIG. 2 are seated on the seating portion 220. The seating portion 220 forms an upper portion of an outer surface of the seat body 200 along the central axis CA. By way of example, the seating portion 220 may include surfaces of a pair of rail portions 221 formed on the upper side of the seat body along the central axis CA.

The seat body 200 has a fixed hood portion 222 located at a rear end of the seating portion 220. The fixed hood portion 222 is located opposite to the movable hood 300 along the central axis CA. The fixed hood portion 222 is formed as a wedge-shaped groove. When the reel is attached to the seat body 200, the first leg is inserted into the fixed hood portion 222, and the fixed hood portion 222 fixes the first leg to the seating portion 220.

When an angler performs a palming motion, the seat body of the reel seat according to one embodiment enables the angler's fingers to stably grip the seat body. Further, the seat body realizes a rapid position change of a finger in the palming motion. To this end, the seat body 200 has a gripping portion 230 which each of the angler's fingers grips. The gripping portion 230 is located below the seating portion 220.

The gripping portion 230 forms an outer surface of the seat body 200, and is configured to be gripped by the angler's fingers. The gripping portion 230 may form the outer surface of the seat body excluding the seating portion 220, i.e., a lateral surface and a lower surface of the seat body. Further, the seat body 200 has a trigger portion 240 that protrudes downward in the gripping portion 230. The trigger portion 240 protrudes in the seat body 200 downward (in a radially outward direction RD of the central axis CA), and is formed as a protrusion having a shape similar to a trigger. When the angler grips the seat body 200, the trigger portion 240 may be situated between a ring finger and a little finger, and can allow the angler to stably grip the seat body through the trigger portion 240.

In the reel seat according one embodiment, the gripping portion 230 includes a first gripping surface portion 2310, a second gripping surface portion 2320, a third gripping surface portion 2330, a fourth gripping surface portion 2340, and a fifth gripping surface portion 2350. The first to fifth gripping surface portions 2310, 2320, 2330, 2340, and 2350 are located sequentially from the front end of the seat body in the rearward direction BD.

The first gripping surface portion 2310 is spaced apart frontward farthest from the trigger portion 240. In the reel seat according to one embodiment, the first gripping surface portion 2310 includes a protruding surface portion 2311 spaced apart farthest from the trigger portion 240, and a bulging surface portion 2312 connecting with the protruding surface portion 2311 and extending rearward from the protruding surface portion 2311. The protruding surface portion 2311 is located below the central axis CA of the bore.

The protruding surface portion 2311 is formed as a curved surface, which is arcuately curved along a circumferential direction CD of the central axis and is concavely arcuately curved with the respect to the central axis CA. The bulging surface portion 2312 is formed as curved surface, which is arcuately curved along the circumferential direction CD and is convexly bulged in the radially outward direction RD.

The second gripping surface portion 2320 extends rearward from the bulging surface portion 2312 of the first gripping surface portion. The third gripping surface portion 2330 extends rearward from the second gripping surface portion 2320 to the trigger portion 240. The third gripping surface portion 2330 may be the outer surface of the seat body, which transitions from the second gripping surface portion 2320 to the trigger portion 240. The fourth gripping surface portion 2340 extends rearward from the third gripping surface portion 2330, and forms a front surface of the trigger portion 240. The fifth gripping surface portion 2350 is separated from the fourth gripping surface portion 2340, and is located between the trigger portion 240 and the rear end of the seat body 200. According to the embodiments of the reel seat, the seat body 200 may not include the fifth gripping surface portion 2350, and a rear end of the trigger portion 240 may connect with the rear end of the seat body.

FIG. 6 is an exploded side view of the reel seat shown in FIG. 3. Reference is made to FIGS. 3, 5, and 6.

The seat body 200 includes a cylindrical end portion 250 coupled to the movable hood 300. The cylindrical end portion 250 extends frontward from the seating portion 220 and the first gripping surface portion 2310 (the protruding surface portion 2311 of the first gripping surface portion) along the central axis CA. The protruding surface portion 2311 is located below the central axis CA, and is formed so as to protrude in the radially outward direction RD with respect to the cylindrical end portion 250.

The cylindrical end portion 250 has a male thread 251. The male thread 251 is formed on an outer periphery of the cylindrical end portion 250, and is located in a predetermined range between the front end of the seat body and the first gripping surface portion 2310. The male thread 251 is coupled to the movable hood 300 through screwing action. The cylindrical end portion 250 has a pair of guide grooves 252. The pair of guide grooves 252 are located opposite to each other with reference to the central axis CA of the bore 210. The pair of guide grooves 252 guide movement of the movable hood 300 along the central axis CA. Each guide groove 252 extends along the central axis CA from a front end of the cylindrical end portion (the front end of the seat body) through the male thread 251 up to the rail portion 221. Each guide groove 252 passes by an upper end edge 2313 of the protruding surface portion 2311 of the first gripping surface portion along the central axis CA.

The movable hood 300 is coupled to the cylindrical end portion 250 so as to be movable along the central axis CA of the bore, and fixes the reel to the seating portion 220. The movable hood 300 is moved toward the fixed hood portion 222, and presses and fixes the second leg of the reel to the seating portion 220. The movable hood 300 can be moved along the cylindrical end portion 250 by means of screwing action. The movable hood 300 includes a fastening nut 310 causing the screwing action, and a movable body 320 movable along the central axis CA by the fastening nut 310. The fastening nut 310 and the movable body 320 are formed in a ring shape, and the cylindrical end portion 250 passes through the fastening nut 310 and the movable body 320.

The fastening nut 310 is rotatable along the outer periphery of the cylindrical end portion 250. The fastening nut 310 has a female thread 311 on its inner periphery, and is coupled to the cylindrical end portion 250 so as to be rotatable in the circumferential direction CD of the central axis CA. The male thread 251 and the female thread 311 are engaged to each other, whereby the fastening nut 310 is coupled to the cylindrical end portion 250 so as to be movable through the screwing action. As the fastening nut 310 is rotated in the circumferential direction CD by the angler, the fastening nut 310 may be moved frontward or rearward together with its rotation due to the screwing action between the female thread 311 and the male thread 251.

The fastening nut 310 is connected to the movable body 320 so as to be relatively rotatable in the circumferential direction CD. The movable body 320 is movable along the central axis CA, but is not rotated in the circumferential direction CD. The movable body 320 is guided by the guide grooves 252 of the cylindrical end portion so as to be moved only along the central axis CA. The movable body 320 includes an annular portion 321, a movable hood portion 322, an accommodating portion 323, and a pair of guide protrusions 324.

The fastening nut 310 includes, in a rear end portion thereof, a flange 312, an engagement groove 313 adjacent to the flange 312, and an engagement protrusion 314 adjacent to the engagement groove 313. The flange 312, the engagement groove 313, and the engagement protrusion 314 extend in the circumferential direction CD. The annular portion 321 of the movable body includes, at a front end portion thereof, an engagement protrusion 3211 and an engagement groove 3212 adjacent to the engagement protrusion 3211. The engagement protrusion 3211 and the engagement groove 3212 extend in the circumferential direction CD. The engagement protrusion 3211 is engaged with the engagement groove 313 of the fastening nut, and the engagement protrusion 314 of the fastening nut is engaged with the engagement groove 3212. Since the fastening nut 310 can be rotated in the circumferential direction CD in a state where the engagement protrusion 314 of the fastening nut is engaged with the engagement groove 3212 of the annular portion, the fastening nut 310 is relatively rotatably coupled to the movable body 320.

The movable hood portion 322 forms a portion of upper and rear portions of the movable body 320. The accommodating portion 323 is located at the opposite side of the movable hood portion 322, and forms a portion of lower and rear portions of the movable body 320. The movable hood portion 322 extends from the annular portion 1230 in the rearward direction BD, and is formed in a shape covering a portion of the reel (for example, the second leg of the reel). By way of example, the movable hood portion 322 may have a shape that corresponds to a shape obtained by bisecting a truncated cone in an axial direction thereof. The accommodating portion 323 is formed as a space that is located at the opposite side of the movable hood portion 322, for example, below the movable hood portion 322. When assuming the truncated cone shape of the movable body 320, the accommodating portion 323 may be formed in a shape that corresponds to a shape obtained by cutting away such a truncated cone shape so that the movable hood portion 322 remains.

The pair of guide protrusions 324 guide the movement of the movable body 320. The pair of guide protrusions 324 may be formed at a pair of lower end edges 3221 of the movable hood portion 322, respectively, and protrude toward the central axis CA. Each guide protrusion 324 is slidably inserted to each guide groove 252. The guide groove 252 formed along the central axis CA restricts the rotation of the guide protrusions 324 in the circumferential direction CD. Therefore, the guide protrusions 324 and the movable body 320 can be moved only along the central axis CA by the guide grooves 252.

If the fastening nut 310 is rotated in one direction in the circumferential direction CD, the fastening nut 310 moves the movable body 320 toward the fixed hood portion 222 through the flange 312 by the screwing action between the male thread 251 and the female thread 311. As the movable body 320 is moved toward the fixed hood portion 222 by the fastening nut 310, the movable hood portion 322 is brought into contact with a portion of the reel (the second leg of the reel). As the fastening nut 310 is further rotated in a state where the movable hood portion 322 is in contact with the second leg of the reel, the movable hood portion 322 can press and fix the second leg to the seating portion 220 of the seat body by the thread fastening force between the male thread 251 and the female thread 311. If the fastening nut 310 is rotated in a direction opposite to the one direction, the fastening nut 310 is moved away from the fixed hood portion 222 by the screwing action between the male thread 251 and the female thread 311. The engagement protrusion 314 of the fastening nut 310 pulls the engagement protrusion 3211 of the annular portion 321 frontward, whereby the movable body 320 and the movable hood portion 322 are moved away from the fixed hood portion 222. The movable body 320 is pushed toward the fixed hood portion 222 or moved away from the fixed hood portion 222 by the frontward or rearward movement of the fastening nut 310.

The movable body 320 includes a reinforcing cover 325 reinforcing the movable hood portion 322. The reinforcing cover 325 is engaged with the pair of lower end edges 3221 of the movable hood portion 322, and is formed so as to cover the movable hood portion 322 in the circumferential direction CD. When the movable hood portion 322 presses and fixes the second leg to the seating portion, the reinforcing cover 325 can prevent the movable hood portion and the guide protrusions from being deformed in a lateral direction of the seat body, and can allow the guide protrusions 324 to be surely retained in the guide grooves 252.

The protruding surface portion 2311 of the first gripping surface portion and the accommodating portion 323 of the movable body are located opposite to each other along the central axis CA. The protruding surface portion 2311 and the accommodating portion 323 have a complementary shape. The protruding surface portion 2311 has an upper end edge 2313 corresponding to the lower end edge 3221 of the movable hood portion, and a front end edge 2314 corresponding to a rear end edge 3231 of the accommodating portion 323. The protruding surface portion 2311 is formed such that an insertion space is formed between the upper end edge 2313 and a surface of the guide groove 252. When the movable body 320 is moved toward the fixed hood portion 222, a portion of the guide protrusion 324 can be inserted into such an insertion space. Since the protruding surface portion 2311 and the accommodating portion 323 have a complementary shape, the protruding surface portion 2311 can be inserted to the accommodating portion 323, and the accommodating portion 323 can accommodate the protruding surface portion 2311.

As the movable body 320 is moved toward the fixed hood portion 222 by the fastening nut 310, the movable hood portion 322 is moved rearward alongside the upper end edge 2313 of the protruding surface portion 2311, and is positioned above the protruding surface portion 2311. Further, as the movable hood portion 322 is moved toward the fixed hood portion 222, the protruding surface portion 2311 is inserted to and accommodated in the accommodating portion 323. Therefore, when the movable hood portion 322 presses and fixes the second leg to the seating portion 220, the movable hood portion 322 is positioned above the protruding surface portion 2311 of the first gripping surface portion, and the movable hood portion 322 and the protruding surface portion 2311 are positioned in a vertical direction VD. Further, at the same time when the movable hood portion 322 is positioned above the protruding surface portion 2311, the protruding surface portion 2311 is inserted to the accommodating portion 323. Accordingly, the reel seat according to one embodiment can be configured to have a reduced overall length, and can be configured such that the seat body has a long gripping range gripped by the angler's fingers.

The seat body 200 has an inclined edge 223 interconnecting the rail portion 221 and the upper end edge 2313 of the protruding surface portion. The inclined edge 223 is inclined upward and rearward from the upper end edge 2313 of the protruding surface portion, and is connected to the rail portion 221. The movable hood portion 322 of the movable hood has a rear end edge 3222 that is inclined so as to correspond to the inclined edge 223. When the movable hood portion 322 fixes the second leg to the seating portion 220, the rear end edge 3222 is located adjacent to the inclined edge 223.

The movable hood shown in FIGS. 5 and 6 includes the fastening nut 310. In the reel seat according to another embodiment, the movable hood may include a locking nut that is located in front of the fastening nut so as to prevent the fastening nut from being loosened (for example, a locking nut 330 shown in FIG. 2). The locking nut is coupled to the cylindrical end portion so as to be moved through the screwing action, similarly to the coupling form of the fastening nut and the cylindrical end portion.

In the reel seat according to one embodiment, the seat body 200 is integrally formed by injection molding. The seat body 200 may be integrally molded from thermoplastic resin so as to have the above-described seating portion, fixed hood portion, gripping portion, trigger portion and cylindrical end portion. By way of example, the seat body 200 may be integrally formed using carbon fiber-reinforced thermoplastic resin. The carbon fiber reinforced thermoplastic resin has a lower density and a higher tensile strength, when compared with glass fiber-reinforced thermoplastic resin that is commonly used. Thus, the seat body of the reel seat according to one embodiment can have a reduced weight, and can have a thinner thickness at a portion making contact with the angler's fingers.

Figure 7:
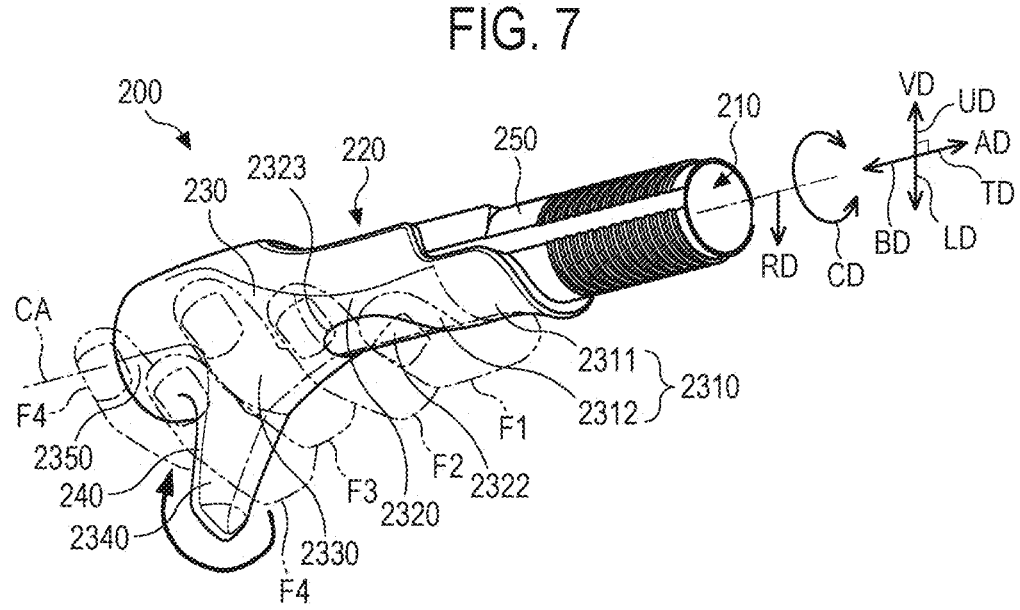
FIG. 7 is a perspective view showing a seat body of a reel seat according to one embodiment.
Figure 8:
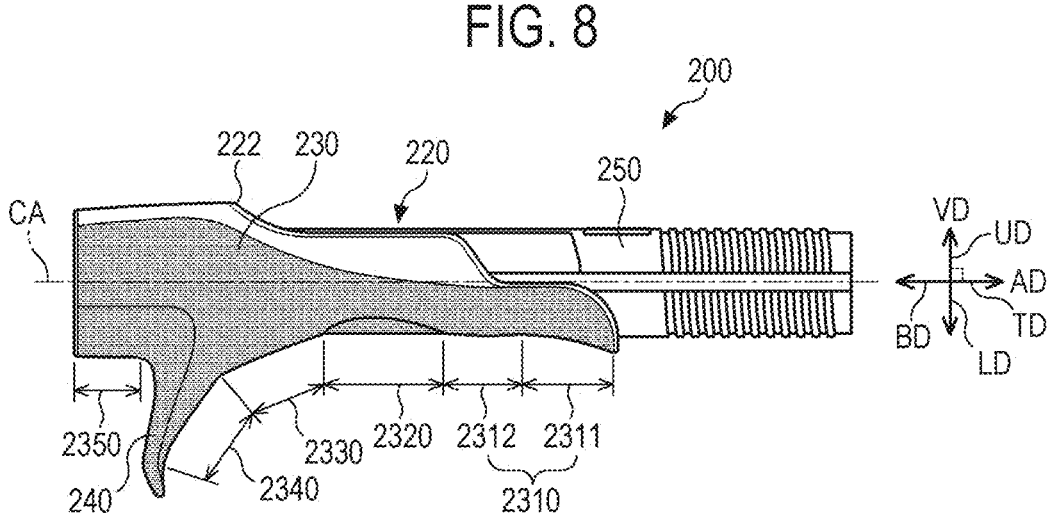
FIG. 8 is a side view of the seat body shown in FIG. 7, and shows a gripping portion of the seat body in gray.
Figure 9:
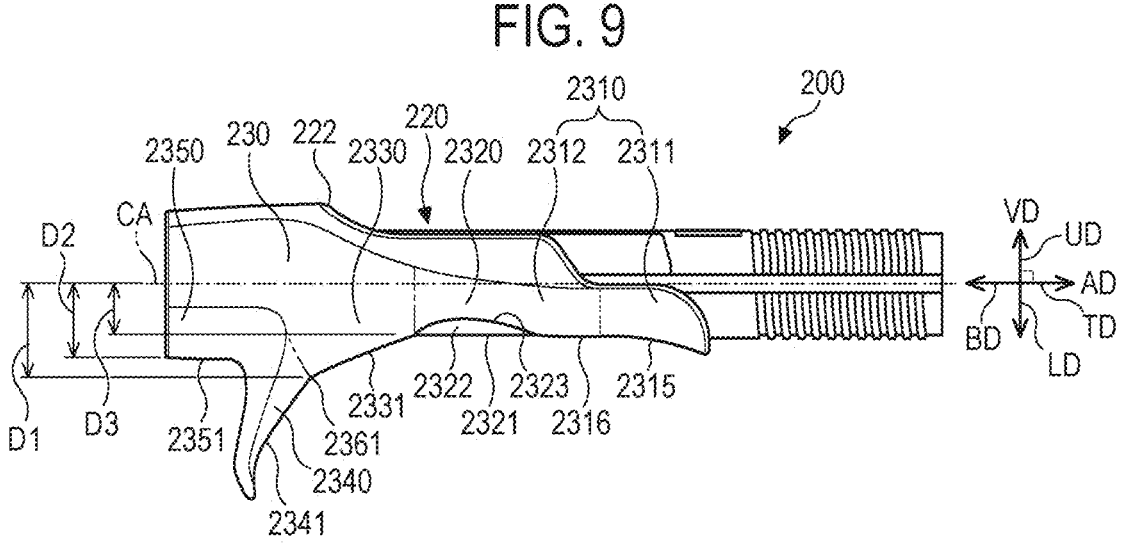
FIG. 9 is a side view of the seat body shown in FIG. 7.
Figure 10:
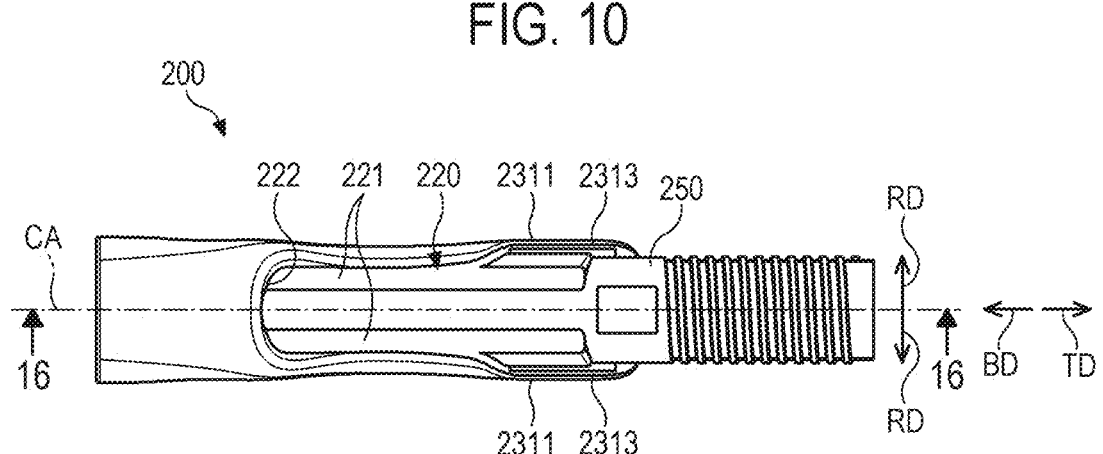
FIG. 10 is a top view of the seat body shown in FIG. 7.

FIG. 7 is a perspective view showing a seat body of a reel seat according to one embodiment, and shows an angler's fingers gripping the seat body by an alternate long and two short dashes line. FIG. 8 is a side view of the seat body shown in FIG. 7, and shows a gripping portion of the seat body in gray. FIG. 9 is a side view of the seat body shown in FIG. 7. FIG. 10 is a top view of the seat body shown in FIG. 7. Reference is made to FIGS. 7 to 10.

The seat body 200 includes the gripping portion 230 located below the seating portion 220, and the trigger portion 240 protruding downward in the gripping portion 230. The gripping portion 230 forms the outer surface of the seat body below the seating portion 220, and can be gripped by the angler's fingers. The trigger portion 240 can be gripped by the angler's fingers, and can support the angler's fingers. In the reel seat according to one embodiment, the gripping portion 230 includes the first gripping surface portion 2310, the second gripping surface portion 2320, the third gripping surface portion 2330, the fourth gripping surface portion 2340, and the fifth gripping surface portion 2350, thereby providing distinguished and divided gripping ranges to the angler's fingers. An edge of each gripping surface portion, which is observed in the side view of the seat body 200, or which is observed when viewing the seat body 200 from a lateral side, forms a line. Further, the edge of each gripping surface portion, which is observed in the cross-sectional view or the front view view of the seat body 200, or which is observed when viewing the seat body from a front side or a rear side, forms a line. In the present disclosure, the line forming the edge of each gripping surface portion, which is observed in the side view, the cross-sectional view, or the front view of the seat body, is referred to as a contour line.

The first gripping surface portion 2310 is configured to be gripped by an index finger F1. The first gripping surface portion 2310 includes a curved surface forming the protruding surface portion 2311, and a curved surface forming the bulging surface portion 2312. In the side view of the seat body, or when viewing the seat body from a lateral side, the first gripping surface portion 2310 has lower end contour lines 2315 and 2316. Specifically, the first gripping surface portion 2310 has a first lower end contour line 2315 located in the protruding surface portion 2311, and a second lower end contour line 2316 located in the bulging surface portion 2312 and connecting with the first lower end contour line 2315. The first lower end contour line 2315 is formed as a curved line that is arcuately curved concavely toward the central axis CA. The second lower end contour line 2316 is formed as a curved line that is arcuately curved convexly with respect to the central axis CA. Thus, the first gripping surface portion 2310 has the lower end contour lines 2315 and 2316 that are formed in a waveform. The lower end contour lines 2315 and 2316 having the waveform are arcuately curved concavely with respect to the central axis toward the rear end of the seat body, and, thereafter, is arcuately curved convexly with respect to the central axis.

The second gripping surface portion 2320 connects with the first gripping surface portion 2310, and extends rearward from the first gripping surface portion 2310. The second gripping surface portion 2320 is configured to be gripped by the index finger F1 and a middle finger F2. The second gripping surface portion 2320 is formed as a curved surface that is arcuately curved discontinuously along the circumferential direction CD. In the side view of the seat body, the second gripping surface portion 2320 has a third lower end contour line 2321. The third lower end contour line 2321 connects with the second lower end contour line 2316, and is formed as a straight line. The third lower end contour line 2321 may be parallel with the central axis CA. Alternatively, the third lower end contour line 2321 may be inclined at a tiny angle with respect to the central axis CA.

The third gripping surface portion 2330 is configured to be gripped by a ring finger F3. The third gripping surface portion 2330 connects with the second gripping surface portion 2320, and extends rearward and downward from the second gripping surface portion 2320. The third gripping surface portion 2330 extends from the second gripping surface portion 2320 to the trigger portion 240, thereby forming a portion of the gripping portion which transitions from the second gripping surface portion 2320 to the trigger portion 240. The third gripping surface portion 2330 extends from the second gripping surface portion 2320 so as to be inclined obliquely downward with respect to the central axis CA, specifically, to be inclined in an oblique direction between the rearward direction BD and a downward direction LD. The third gripping surface portion 2330 is inclined with respect to the central axis CA such that a vertical distance between the central axis CA and a point of the third gripping surface portion perpendicular to the central axis increases in the rearward direction BD. Since the third gripping surface portion 2330 is inclined with respect to the central axis CA, in the side view of the seat body, the third gripping surface portion 2330 has a first inclined front end contour line 2331. The first inclined front end contour line 2331 connects with the third lower end contour line 2321. In the reel seat according to one embodiment, the first inclined front end contour line 2331 may be formed as a straight line.

The fourth gripping surface portion 2340 is configured to be gripped by a little finger F4. The fourth gripping surface portion 2340 connects with the third gripping surface portion 2330, and extends rearward and downward from the third gripping surface portion 2330. The fourth gripping surface portion 2340 is a portion of the gripping portion, which forms the front surface of the trigger portion 240. The fourth gripping surface portion 2340 extends from the third gripping surface portion 2330 so as to be inclined with respect to the central axis CA downward more obliquely than the third gripping surface portion 2330, specifically so as to be inclined further than the third gripping surface portion 2330 in an oblique direction between the rearward direction BD and the downward direction LD. The fourth gripping surface portion 2340 is inclined with respect to the central axis CA such that a vertical distance between the central axis CA and a point of the fourth gripping surface portion perpendicular to the central axis increases in the rearward direction BD. Since the fourth gripping surface portion 2340 is inclined with respect to the central axis CA, in the side view of the seat body, the fourth gripping surface portion 2340 has a second inclined front end contour line 2341. The second inclined front end contour line 2341 connects with the first inclined front end contour line 2331. In the reel seat according to one embodiment, the second inclined front end contour line 2341 may be formed as a straight line.

The fifth gripping surface portion 2350 is located between the trigger portion 240 and the rear end of the seat body, and extends from an upper end of the trigger portion 240 to the rear end of the seat body 200. The fifth gripping surface portion 2350 is configured to be gripped by the little finger F4. By way of example, when the angler changes or switches a gripping position of the little finger F4, the little finger F4 can be moved from the fourth gripping surface portion 2340 via the trigger portion 240 to the fifth gripping surface portion 2350 (see a bold arrow of FIG. 7). The fifth gripping surface portion 2350 is configured to be gripped by the little finger F4 which is moved from the fourth gripping surface portion 2340. The fifth gripping surface portion 2350 is formed as a curved surface that is arcuately curved in the circumferential direction CD. In the side view of the seat body, the fifth gripping surface portion 2350 has a fourth lower end contour line 2351. The fourth lower end contour line 2351 may be formed as a straight line. The fourth lower end contour line 2351 may be parallel with the central axis CA, or may be inclined at a tiny angle with respect to the central axis CA. By way of example, the fourth lower end contour line 2351 is formed as a straight line having a length in a range of 10 mm to 18 mm, thereby providing a length enabling the little finger to be sufficiently caught on the fifth gripping surface portion.

In the reel seat according to one embodiment, the lower end contour line of the second gripping surface portion 2320 is located closest to the central axis CA, and a conjunction point of the third gripping surface portion 2330 and the fourth gripping surface portion 2340 is located most distantly from the central axis CA than the lower end contour lines of the first gripping surface portion 2310, the second gripping surface portion 2320, and the fifth gripping surface portion 2350. Referring to FIG. 9, the seat body 200 has a first vertical distance D1, which is measured in the vertical direction VD between the central axis CA and a conjunction point 2361 of the first inclined front end contour line 2331 and the second inclined front end contour line 2341. The seat body 200 has a second vertical distance D2, which is measured in the vertical direction VD between the fourth lower end contour line 2351 and the central axis CA. The seat body 200 has a third vertical distance D3, which is measured in the vertical direction VD between the third lower end contour line 2321 and the central axis CA. The first vertical distance D1 is greater than the second vertical distance D2, and the second vertical distance D2 is greater than the third vertical distance D3. The second gripping surface portion 2320, the third gripping surface portion 2330, the fourth gripping surface portion 2340, and the fifth gripping surface portion 2350 are positioned so as to have the above-described vertical distances, thereby allowing the angler's fingers to stably grip the seat body.

Figures 11, 12:
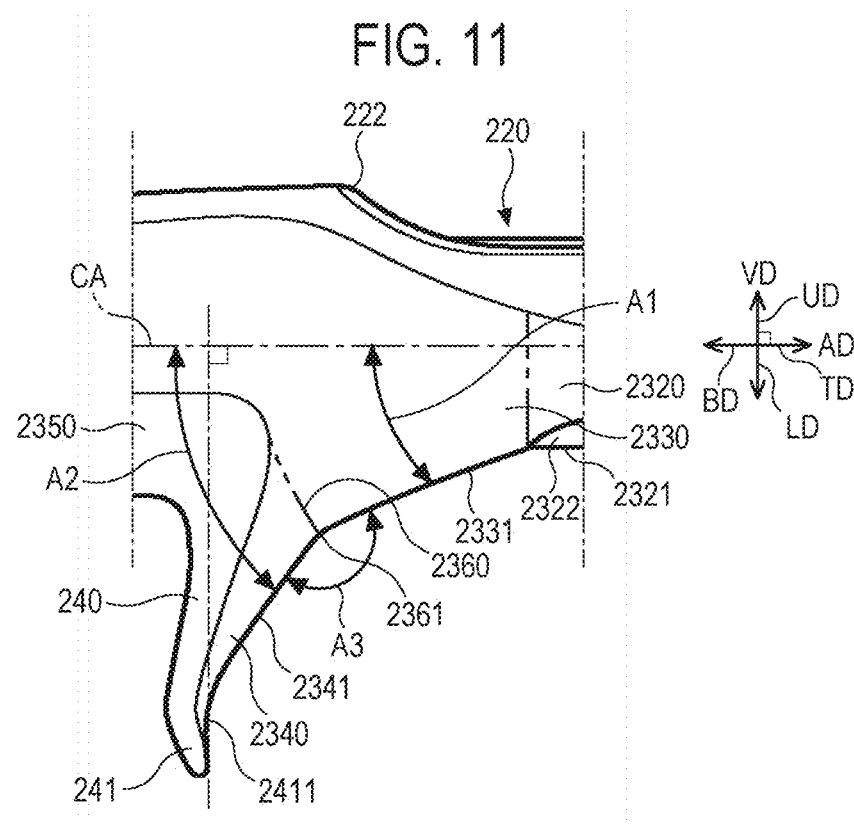
FIG. 11 is an enlarged side view of the seat body shown in FIG. 7.
FIG. 12 is a front view of the seat body shown in FIG. 7.

FIG. 11 is an enlarged side view of the seat body shown in FIG. 7. Reference is made to FIGS. 7, 8, and 11.

The third gripping surface portion 2330 is not only inclined downward with respect to the central axis CA, but also extends from the second gripping surface portion to the trigger portion 240. The fourth gripping surface portion 2340 extends from the third gripping surface portion 2330 so as to be inclined more downward than the third gripping surface portion 2330. The first inclined front end contour line 2331 of the third gripping surface portion 2330 is inclined at a first inclination angle A1 with respect to the central axis CA, and the second inclined front end contour line 2341 of the fourth gripping surface portion 2340 is inclined at a second inclination angle A2 with respect to the central axis CA. The second inclination angle A2 is greater than the first inclination angle A1. Thus, the third gripping surface portion 2330 and the fourth gripping surface portion 2340 are formed so as to be distinguished and divided from each other in the gripping portion and the trigger portion, and therefore can provide the distinguished gripping range to each of the ring finger F3 and the little finger F4. Further, the third gripping surface portion 2330 and the fourth gripping surface portion 2340 inclined more obliquely than the third gripping surface portion provide different inclination feels to the ring finger F3 and the little finger F4, and therefore, the angler can feel, on the ring finger F3 and the little finger F4, grip feels distinguished from each other.

The third and fourth gripping surface portions 2330 and 2340, which are distinguishably gripped by the ring finger F3 and the little finger F4, are inclined at specific angles with respect to the central axis CA. By way of example, the first inclined front end contour line 2331 of the third gripping surface portion 2330 is inclined downward from the central axis CA at the first inclination angle A1 that is in a range of 20 degrees to 30 degrees. Further, by way of example, the second inclined front end contour line 2341 of the fourth gripping surface portion is inclined downward from the central axis CA at the second inclination angle A2 that is in a range of 55 degrees to 70 degrees. That is, the second inclined front end contour line 2341 is inclined at an inclination angle greater than the inclination angle of the first inclined front end contour line 2331, thereby providing clearly distinguishable inclination feel and grip feel to the ring finger F3 and the little finger F4. Further, by way of example, the first inclined front end contour line 2331 is formed as a straight line having a length in a range of 12 mm to 20 mm, thereby providing a length enabling the ring finger F3 to sufficiently grip the third gripping surface portion.

The third gripping surface portion 2330 and the fourth gripping surface portion 2340 are inclined at angles different from each other, and the third gripping surface portion 2330 and the fourth gripping surface portion 2340 are clearly divided in the gripping portion 230. The gripping portion 230 includes a trigger boundary portion 2360 that divides the third gripping surface portion 2330 and the fourth gripping surface portion 2340. The trigger boundary portion 2360 may be formed in a shape of a line in the gripping portion 230. The trigger boundary portion 2360 is formed in a circular arc shape between the third gripping surface portion 2330 and the fourth gripping surface portion 2340, and is inclined with respect to the central axis CA. That is, in the side view of the seat body, the trigger boundary portion 2360 is formed in a shape of a line inclined with respect to the central axis CA, and extends from the conjunction point 2361 of the third gripping surface portion and the fourth gripping surface portion in an oblique direction between the rearward direction BD and the upward direction UD. Since the third gripping surface portion 2330 and the fourth gripping surface portion 2340 are inclined at different angles through the trigger boundary portion 2360, the gripping portion 230 is angularly bent through the trigger boundary portion 2360 so as to divide the third gripping surface portion 2330 and the fourth gripping surface portion 2340 from each other.

The third and fourth gripping surface portions 2330 and 2340 inclined at different angles are inclined with respect to each other so as to form an included angle A3 centered on the conjunction point 2361. Therefore, in the side view of the seat body, the third and fourth gripping surface portions 2330 and 2340 are situated so as to correspond to respective oblique sides of a triangular shape, and the included angle A3 forms a vertex angle of such a triangular shape. That is, the first and second inclined front end contour lines 2331 and 2341 formed as a straight line can correspond to the respective oblique sides of the triangular shape. Since the first inclination angle A1 is in the range of 20 degrees to 30 degrees and the second inclination angle A2 is in the range of 55 degrees to 70 degrees, the first and second inclined front end contour lines 2331 and 2341 may form the included angle A3 in a range of 130 degrees to 155 degrees.

Figures 13, 14:
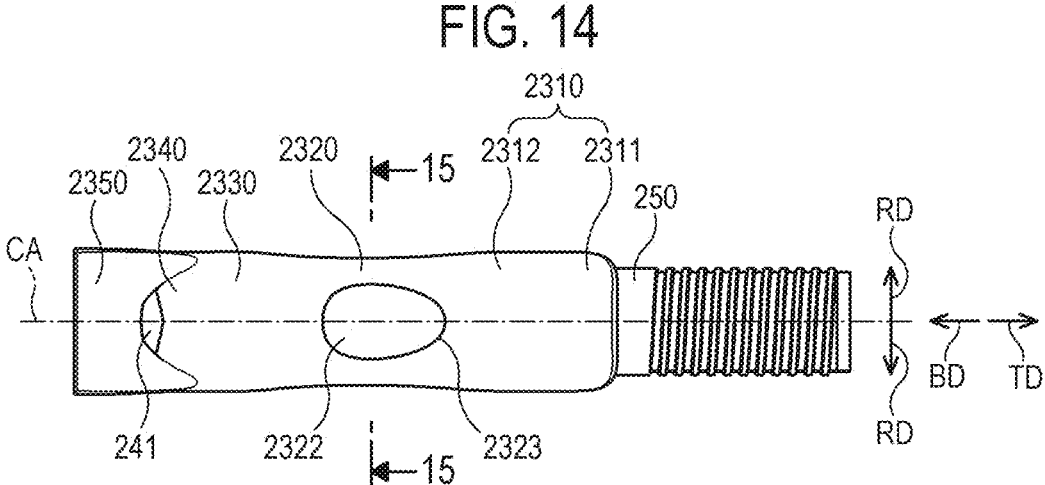
FIG. 13 is a rear view of the seat body shown in FIG. 7.
FIG. 14 is a bottom view of the seat body shown in FIG. 7.

In the reel seat according to one embodiment, the trigger portion 240 includes a lower end portion on which the little finger F4 is caught. The lower end portion of the tripper portion can allow the little finger F4 to be moved rapidly from the fourth gripping surface portion 2340 to the fifth gripping surface portion 2350. FIGS. 12 and 13 are a front view and a rear view of the seat body shown in FIG. 7, respectively. Reference is made to FIGS. 11 to 13.

The trigger portion 240 includes a catching lower end portion 241 connecting with the fourth gripping surface portion 2340, and the little finger gripping the fourth gripping surface portion 2340 can be caught on the catching lower end portion 241. The catching lower end portion 241 is inclined with respect to the central axis CA at an inclination angle greater than the second inclination angle A2, and, therefore, can support the little finger. Thus, the catching lower end portion 241 can prevent the little finger from sliding and falling from the fourth gripping surface portion 2340.

In the side view of the seat body, the catching lower end portion 241 has a vertical front end contour line 2411. The vertical front end contour line 2411 connects with the second inclined front end contour line 2341, and is perpendicular to the central axis CA. Further, in the front view and the rear view of the reel seat, the catching lower end portion 241 has a shape of an inverted triangle. Therefore, a pair of lateral end edges 2412 of the catching lower end portion 241 corresponds to a pair of oblique sides of an inverted triangle having a downward vertex, respectively. Further, an included angle A4 between the pair of lateral end edges 2412 corresponds to a vertex angle of the inverted triangle, and a lowermost end of the catching lower end portion 241 corresponds to a vertex of the inverted triangle. When the little finger is moved from the fourth gripping surface portion 2340 to the fifth gripping surface portion 2350 in order to change the gripping position of the little finger, each lateral end edge 2412 of the catching lower end portion 241 formed in the inverted triangle enables the little finger to be moved rapidly and smoothly.

FIG. 14 is a bottom view of the seat body shown in FIG. 7. Reference is made to FIGS. 7, 9, and 14.

When a fish bites a lure or a jig during fishing, the biting of the fish is delivered to the rod body and the seat body through a fishing line as a form of vibration. The vibration caused by the biting of the fish may be referred to as a bite signal. In the reel seat according to one embodiment, the seat body 200 can surely deliver the bite signal to the middle finger F2 gripping the second gripping surface portion 2320.

The second gripping surface portion 2320 of the gripping portion includes a bite signal delivering portion 2322 configured to deliver the bite signal to the middle finger F2, and a bite signal boundary portion 2323 distinguishing and dividing the bite signal delivering portion 2322 from the first gripping surface portion 2310 and the third gripping surface portion 2330. The bite signal delivering portion 2322 is located between the first gripping surface portion 2310 and the third gripping surface portion 2330, and the bite signal boundary portion 2323 is formed so as to surround the bite signal delivering portion 2322. The bite signal boundary portion 2323 is formed in a shape of a line in the second gripping surface portion 2320. The bite signal boundary portion 2323 is formed in a shape of a circle or an ellipse between the first gripping surface portion 2310 and the third gripping surface portion 2330, thereby dividing the bite signal delivering portion 2322 having a circular or elliptical shape from the first gripping surface portion 2310 and the third gripping surface portion 2330.

Figures 15, 16:
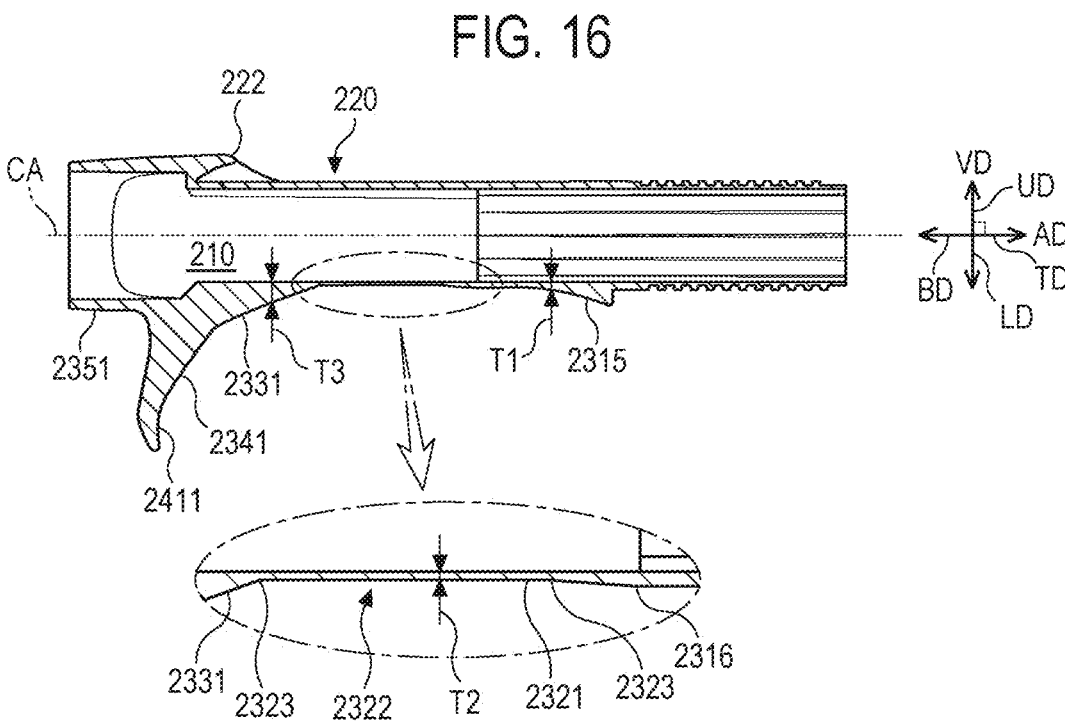
FIG. 15 is a cross-sectional view taken along line 15-15 of FIG. 14.
FIG. 16 is a cross-sectional view taken along line 16-16 of FIG. 10.

FIG. 15 is a cross-sectional view taken along line 15-15 of FIG. 14, and FIG. 16 is a cross-sectional view taken along line 16-16 of FIG. 10. Reference is made to FIGS. 14 to 16.

The bite signal delivering portion 2322 is located along the central axis CA between the first gripping surface portion 2310 and the third gripping surface portion 2330 in the lower side of the seat body. The bite signal delivering portion 2322 may be formed as a curved surface that is similar to an outer surface of a cylindrical shape centered on the central axis CA. Therefore, in the side view of the seat body, the third lower end contour line 2321 of the second gripping surface portion 2320, which is formed as a straight line, becomes the lower end contour line of the bite signal delivering portion 2322. Further, in the cross-sectional view of the seat body, the bite signal delivering portion 2322 has an outer peripheral contour line 2324 that becomes a portion of a circumference line of an imaginary circle IC1 centered on the central axis CA. The imaginary circle IC1 is located concentrically with an imaginary inscribed circle IC2 inscribed in the bore 210, and has a radius greater than a radius of the imaginary inscribed circle IC2 (i.e., a radius of the bore 210).

Referring to FIG. 15, the outer peripheral contour line 2324 of the bite signal delivering portion 2322 is a portion of a circumference line having a radius unchanged with respect to the central axis CA, and the second gripping surface portion 2320 has an outer peripheral contour line having a different curvature with reference to the bite signal boundary portion 2323. Referring to FIG. 16, the third lower end contour line 2321 of the bite signal delivering portion 2322 connects with both the second lower end contour line 2316 of the first gripping surface portion 2310 and the first inclined front end contour line 2331 of the third gripping surface portion 2330 through the bite signal boundary portion 2323. The second lower end contour line 2316 is arcuately curved convexly with respect to the central axis CA, and the first inclined front end contour line 2331 is inclined at the first inclination angle with respect to the central axis CA. However, the third lower end contour line 2321 is formed as a straight line, and the bite signal boundary portion 2323 divides the third lower end contour line 2321 from the second lower end contour line 2316 and the first inclined front end contour line 2331. As described above, since the bite signal boundary portion 2323 divides the bite signal delivering portion 2322 from the first and third gripping surface portions 2310 and 2330 and divides the bite signal delivering portion 2322 from other areas of the second gripping surface portion 2320, the bite signal boundary portion 2323 can provide a tactile feel for allowing the middle finger F2 to recognize the bite signal delivering portion 2322 to the middle finger F2.

A thickness of the seat body at the bite signal delivering portion 2322 is less than a thickness of the seat body at other gripping surface portions adjacent to the bite signal delivering portion 2322. The thickness of the seat body may be a distance that is measured between a point located in an inward surface of the bore 210 and a point located in the gripping portion on an imaginary line perpendicular to the central axis CA. By way of example, the seat body 200 may have a first thickness T1 at one point of the first gripping surface portion 2310 spaced frontward from the bite signal delivering portion 2322, may have a second thickness T2 at the bite signal delivering portion 2322, and may have a third thickness T3 at one point of the third gripping surface portion 2330 spaced rearward from the bite signal delivering portion 2322. The first thickness T1 may gradually decrease along the rearward direction BD, and the third thickness T3 may gradually increase along the rearward direction BD. However, the bite signal delivering portion 2322 is formed such that the seat body 200 has a thickness less than both a thickness at the first gripping surface portion 2310 and a thickness at the third gripping surface portion 2330. That is, the seat body 200 has, at the bite signal delivering portion 2322, the second thickness T2 less than the first thickness T1 and the third thickness T3. By way of example, the seat body 200 may have the second thickness T2 in a range of 0.3 mm to 1.0 mm at the bite signal delivering portion 2322.

In the region of the second gripping surface portion 2320 with the bite signal delivering portion 2322 formed therein, the seat body 200 has no cavity between the bite signal delivering portion 2322 and the bore 210, and has a thin thickness. Since the seat body is made of the above-described carbon fiber reinforced thermoplastic resin, the seat body not only has a thin thickness in the region of the bite signal delivering portion 2322, but also can surely deliver the bite signal to the middle finger with a high sensitivity.

Figure 17:
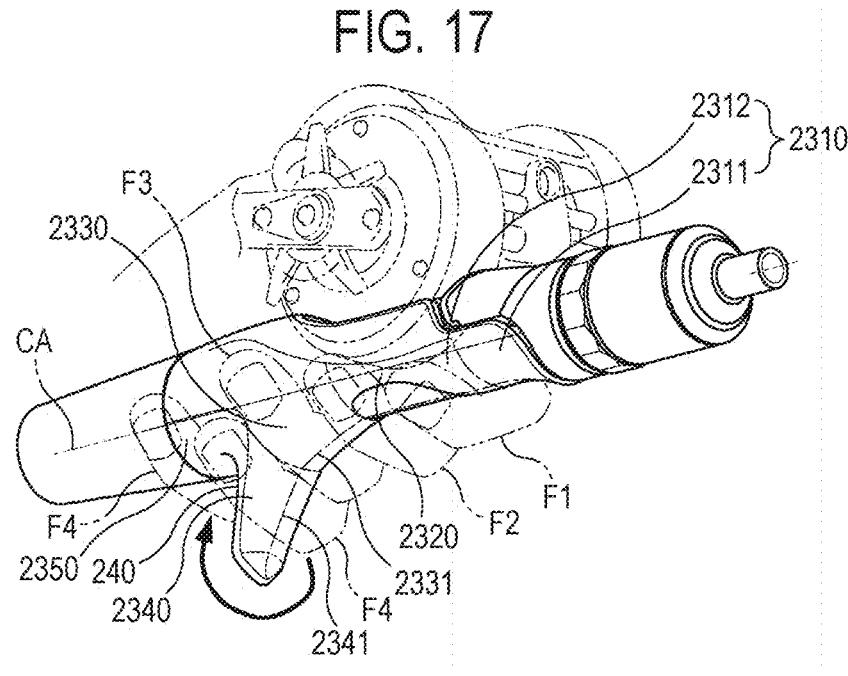
FIG. 17 is a perspective view showing an example where an angler's fingers grip a seat body of a reel seat according to one embodiment in a palming motion.

FIG. 17 is a perspective view showing an example where an angler's fingers grip a seat body of a reel seat according to one embodiment in a palming motion. Reference is made to FIG. 17.

When the angler grips the seat body, the angler may grip the respective gripping surface portions of the gripping portion with four fingers except a thumb. By way of example, in the palming motion, the first to fourth gripping surface portions 2310, 2320, 2330, and 2340 of the gripping portion may be gripped by the index finger F1, the middle finger F2, the ring finger F3, and the little finger F4. Further, to change the gripping positon of the little finger in the palming motion, the little finger F4 may be moved from the fourth gripping surface portion 2340 located in the trigger portion 240 to the fifth gripping surface portion 2350 located in rear of the trigger portion 240 (see a bold arrow of FIG. 17).

The first and second gripping surface portions 2310 and 2320 of the gripping portion have the lower end contour lines formed in different shapes. The third gripping surface portion 2330 of the gripping portion has the first inclined front end contour line 2331 inclined with respect to the central axis CA, and the fourth gripping surface portion 2340 of the gripping portion has the second inclined front end contour line 2341 inclined more downward than the first inclined front end contour line 2331. The gripping surface portions having the above-described distinguishable shapes can provide the distinguishable grip feel and gripping range to the respective fingers. The third gripping surface portion 2330 inclined obliquely downward from the second gripping surface portion 2320 can be gripped by the ring finger F3 in a state where the angler lightly bends a wrist. The middle finger F2 gripping the second gripping surface portion 2320 and the little finger F4 gripping the fourth gripping surface portion 2340 are positioned so as to sandwich the ring finger F3 and, therefore, can assist the gripping of the ring finger F3. Accordingly, the angler can take a stable grip form in the palming motion in a state where tension or pain is not present in the fingers.

The third gripping surface portion 2330 is inclined obliquely downward with respect to the central axis CA, and the fourth gripping surface portion 2340 is inclined downward more obliquely than the third gripping surface portion 2330. Thus, the third gripping surface portion 2330 can limit the gripping range of the ring finger F3, and the fourth gripping surface portion 2340 can clearly distinguish the gripping range of the little finger F4 from the gripping range of the ring finger F3 in the trigger portion 240. Further, after the little finger F4 is moved to the fifth gripping surface portion 2350 via the trigger portion 240 during the palming motion, the ring finger F3 can stably grip the third gripping surface portion 2330, and the angler can take the stable grip form for the palming motion.

Figure 18:
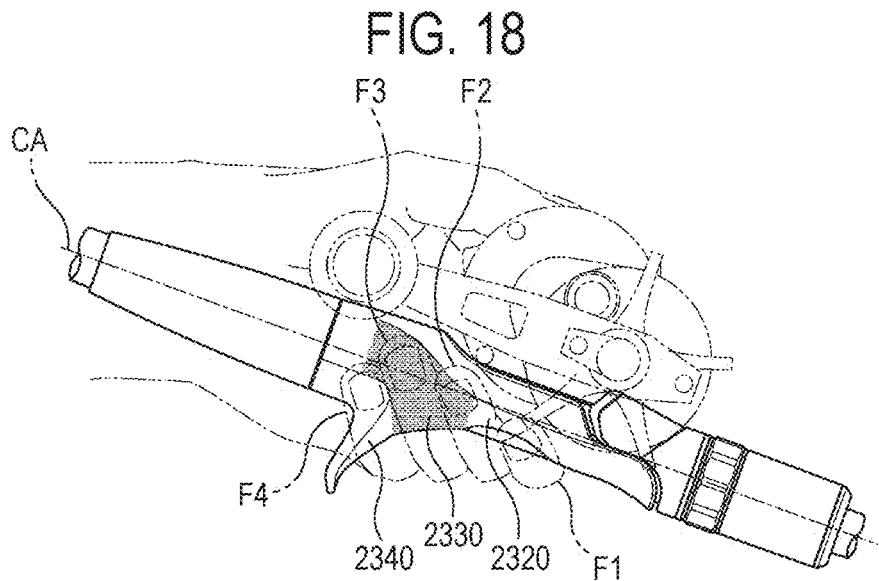
FIG. 18 is a side view showing an example where an angler's ring finger grips a seat body of a reel seat according to one embodiment to maintain a grip form of a palming motion.
Figure 19:
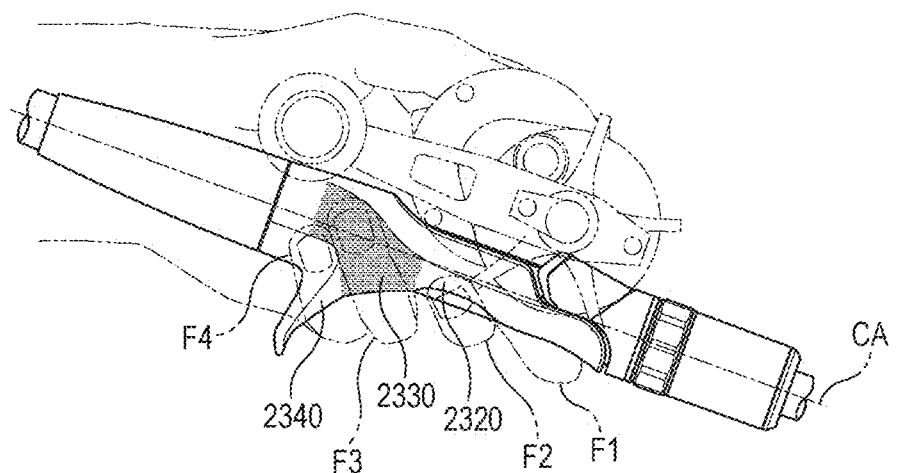
FIG. 19 is a side view showing another example where an angler's ring finger grips a seat body of a reel seat according to one embodiment to maintain a grip form of a palming motion.

FIGS. 18 and 19 are side views showing examples where an angler's ring finger grips a seat body of a reel seat according to one embodiment to maintain a grip form of a palming motion. Reference is made to FIGS. 18 and 19.

In FIGS. 18 and 19, the third gripping surface portion 2330 of the gripping portion is shown in gray. The third gripping surface portion 2330 of the gripping portion divides the gripping range of the ring finger F3 from both the gripping range of the middle finger F2 in the second gripping surface portion 2320 and the gripping range of the little finger F4 in the fourth gripping surface portion 2340, and limits the gripping range of the ring finger F3 in the gripping portion. Accordingly, as shown in FIG. 18, the grip form for the palming motion can be stably maintained in the example where the ring finger F3 grips the third gripping surface portion 2330 in a state where the middle finger F2 and the ring finger F3 are in close contact with each other and are in tension. Further, as shown in FIG. 19, the grip form for the palming motion can be stably maintained in the example where the ring finger F3 grips the third gripping surface portion 2330 in a state where the middle finger F2 and the ring finger F3 have a space therebetween. Therefore, in the reel seat according to one embodiment, due to the third gripping surface portion 2330 clearly limiting the gripping range of the ring finger, the grip form for the palming motion does not collapse and can be stably maintained regardless of the close contact state or the spaced state of the middle finger F2 and the ring finger F3.

Figure 20:
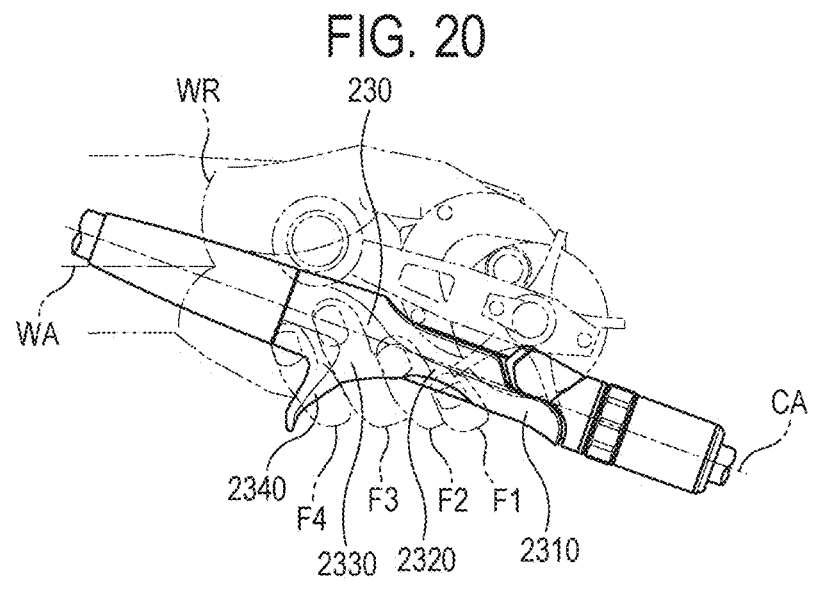
FIG. 20 is a side view showing an example where an angler bends a wrist downward for a palming motion in a state where the angler grips a seat body of a reel seat according to one embodiment.
Figure 21:
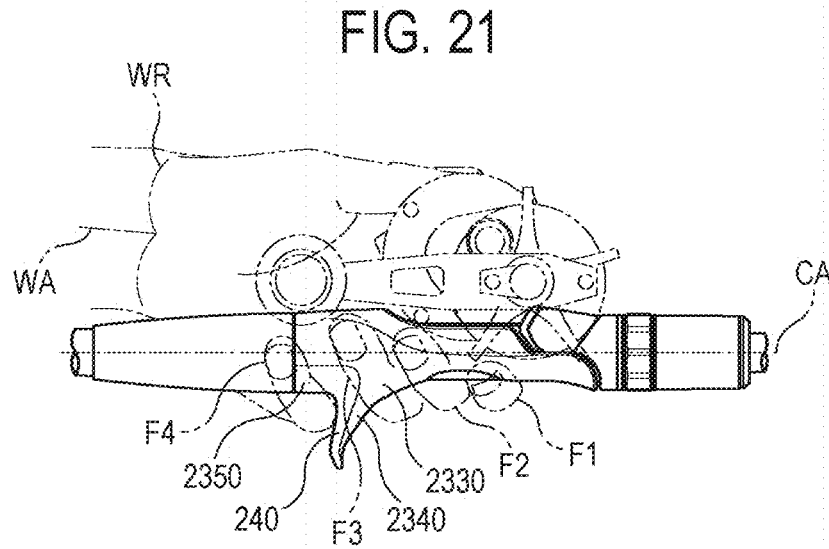
FIG. 21 is a side view showing an example where the angler bends the wrist upward from a state shown in FIG. 20 for a jigging action.
Figure 22:
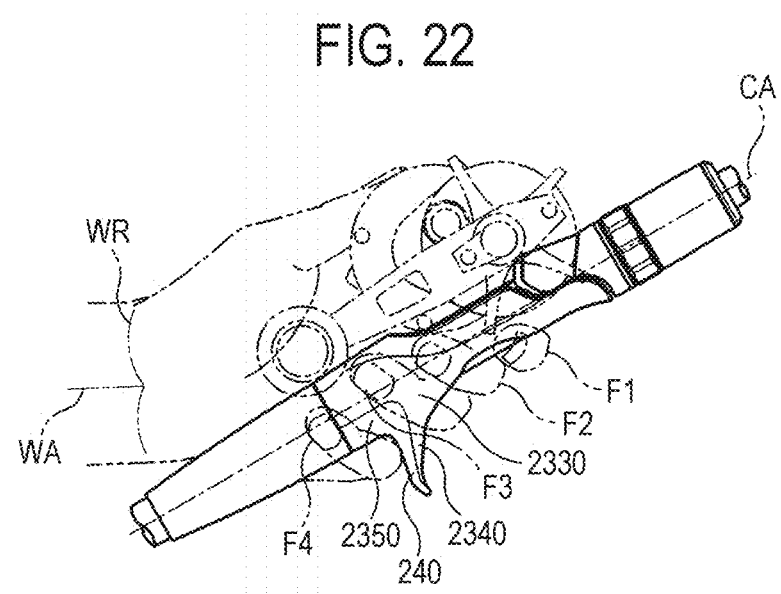
FIG. 22 is a side view showing an example where the angler further bends the wrist upward from a state shown in FIG. 21 for a jigging action.

FIGS. 20 to 22 show examples where an angler does a jigging action in a state where the angler grips a seat body of a reel seat according to one embodiment. FIG. 20 is a side view showing an example where an angler bends a wrist downward for a palming motion. FIG. 21 is a side view showing an example where the angler bends the wrist upward from a state shown in FIG. 20. FIG. 22 is a side view showing an example where the angler further bends the wrist upward from a state shown in FIG. 21. Reference is made to FIGS. 20 to 22.

Referring to FIG. 20, in the palming motion, the angler lowers a tip portion of a fishing rod in the state of gripping the seat body. In the state shown in FIG. 20, a wrist joint WR is bent downward, i.e., in a direction toward the little finger F4, and a wrist is in the state of wrist fixing. Each gripping surface portion of the gripping portion 230 provides a distinguishable gripping range to each finger corresponding to each gripping surface portion. Thus, four fingers F1, F2, F3, and F4 can grip the gripping portion in parallel with a wrist axis WA without applying a strong force to the wrist joint.

When the angler does the jigging action by a snap action of the wrist, the wrist joint WR is bent upward from the wrist-fixed state shown in FIG. 20, i.e., in a direction opposite to the little finger F4. At this time, referring to FIGS. 21 and 22, the little finger F4 is rapidly moved from the fourth gripping surface portion 2340 to the fifth gripping surface portion 2350, and grip the fifth gripping surface portion 2350. The fifth gripping surface portion 2350 is gripped by the little finger F4 moved from the fourth gripping surface portion 2340, and the ring finger F3 stably grips the third gripping surface portion 2330 and is supported by the fourth gripping surface portion 2340. Accordingly, together with the rapid change of the position of the little finger, the stable grip form can be maintained after the change of the gripping position. Further, the movement of the wrist for the jigging action can be smoothly made from the wrist-fixed state shown in FIG. 20.

Figure 23:
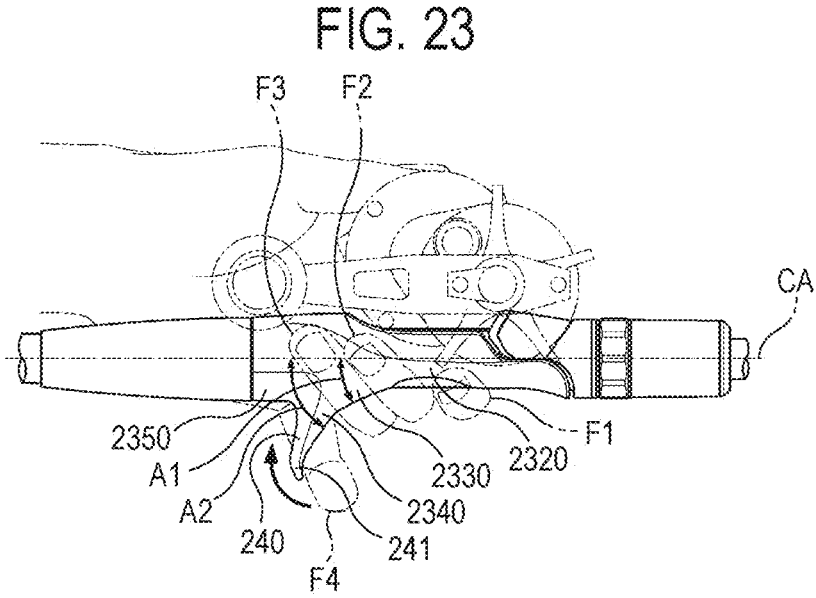
FIG. 23 is a side view showing a movement of a little finger in a palming motion in a state where the angler's fingers grip a seat body of a reel seat according to one embodiment.
Figure 24:
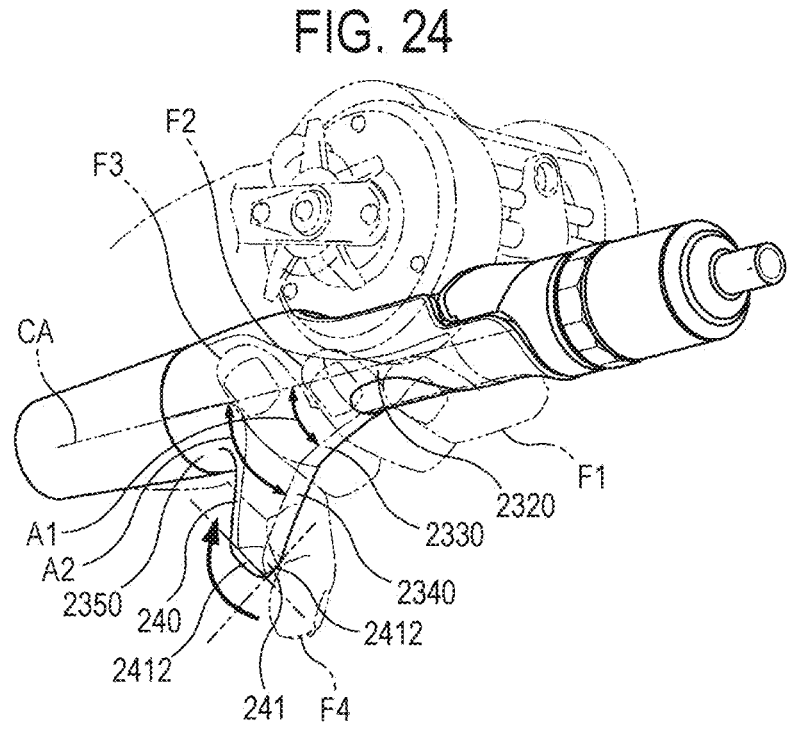
FIG. 24 is a perspective view showing a movement of a little finger in a palming motion in a state where the angler's fingers grip a seat body of a reel seat according to one embodiment.

FIGS. 23 and 24 are a side view and a perspective view, respectively, which show the movement of the little finger F4 in the palming motion in a state where the angler's fingers grip a seat body of a reel seat according to one embodiment. Reference is made to FIGS. 23 and 24.

The third gripping surface portion 2330 extending from the second gripping surface portion 2320 to the trigger portion 240 is inclined with respect to the central axis CA. The fourth gripping surface portion 2340 extending from the third gripping surface portion 2330 and forming the front surface of the trigger portion is inclined with respect to the central axis further than the third gripping surface portion 2330. Therefore, the gripping range of the ring finger F3 and the gripping range of the little finger F4 are clearly distinguished in the trigger portion 240 as well as in front of the trigger portion 240. The catching lower end portion 241 of the trigger portion 240 is inclined with respect to the central axis CA at an inclination angle greater than the second inclination angle A2 of the fourth gripping surface portion 2340. Therefore, the little finger F4 is caught on the catching lower end portion 241 in the grip form of the palming motion, and is prevented from slipping and falling downward. The catching lower end portion 241 has each lateral end edge 2412 formed in an inverted triangle. Thus, the angler lightly spreads out the bent little finger F4, and can rapidly move the little finger F4 to the fifth gripping surface portion 2350 by making the little finger F4 pass by the catching lower end portion 241 along each lateral end edge 2412 of the catching lower end portion 241. After the little finger F4 is moved to the fifth gripping surface portion 2350, the ring finger F3 can be supported by the fourth gripping surface portion 2340. Since the fourth gripping surface portion 2340 is inclined at the second inclination angle A2 greater than the first inclination angle A1 of the third gripping surface portion 2330, the fourth gripping surface portion 2340 can prevent the ring finger F3 from slipping and falling, and the ring finger F3 can stably maintain the grip form gripping the third gripping surface portion 2330.

Figure 25:
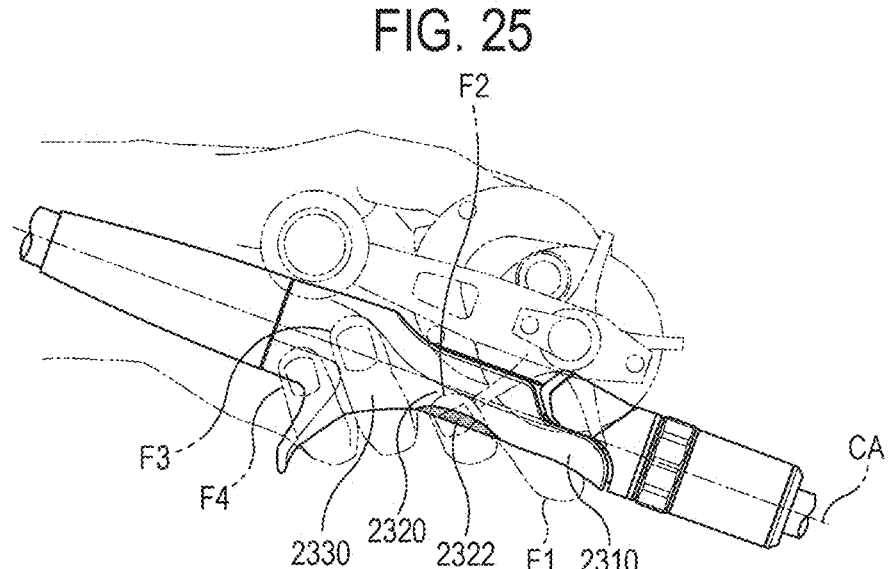
FIG. 25 is a side view showing an example where a middle finger grips a second gripping surface portion in a state where the angler's fingers grip a seat body of a reel seat according to one embodiment.
Figure 26:
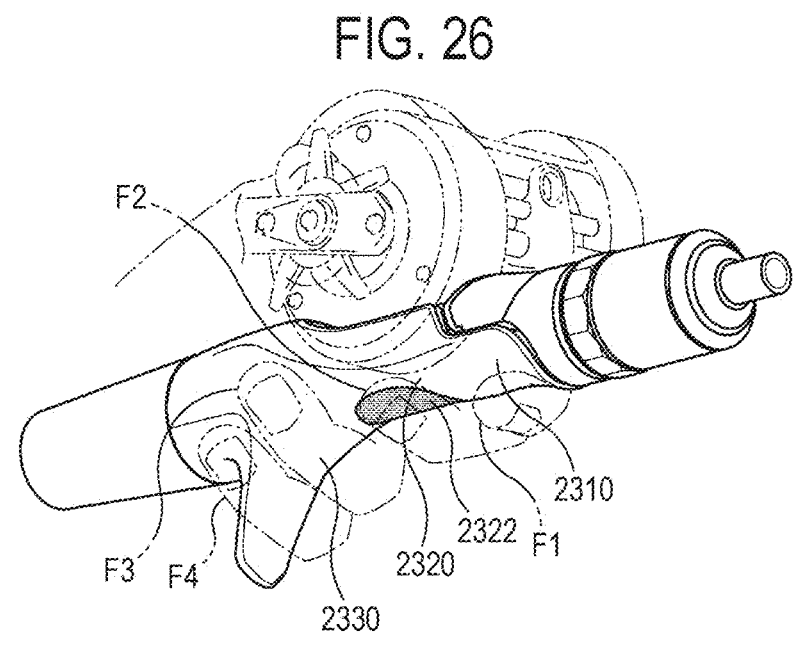
FIG. 26 is a perspective view showing an example where a middle finger grips a second gripping surface portion in a state where the angler's fingers grip a seat body of a reel seat according to one embodiment.

FIGS. 25 and 26 are a side view and a perspective view, respectively, which show an example where the middle finger F2 grips the second gripping surface portion 2320 in a state where an angler's fingers grip a reel seat according to one embodiment. Reference is made to FIGS. 25 and 26.

Since the middle finger F2 can strongly grip the seat body in the palming motion, the middle finger F2 may be insensitive to sensing a bite signal. When the angler stops manipulating the reel and wants to sense a delicate bite signal, the angler softly grips the seat body with the index finger F1 and the middle finger F2, and waits for the bite signal. As shown in FIGS. 25 and 26 in gray, the second gripping surface portion 2320 includes the bite signal delivering portion 2322 that effectively delivers the bite signal to the middle finger F2 waiting for the bite signal. At the bite signal delivering portion 2322, the seat body has a thickness thinner than a thickness at the first and third gripping surface portions 2310 and 2330 adjacent to the bite signal delivering portion 2322. Accordingly, the bite signal generated by biting of a fish can be surely delivered to the middle finger F2 with a high sensitivity through the bite signal delivering portion 2322.

The technical idea of the present disclosure has been described heretofore with reference to some embodiments and examples shown in the accompanying drawings. However, it is to be understood that various substitutions, modifications, and alterations may be made without departing from the technical idea and scope of the present disclosure that can be understood by those of ordinary skill in the technical field to which the present disclosure pertains. Further, it is to be understood that such substitutions, modifications, and alterations fall within the scope of the appended claims.

What is claimed is:

1. A reel seat for mounting a fishing reel to a rod body, comprising:

a seat body including a bore formed in an axial direction of the rod body and coupled to the rod body, a seating portion on which the fishing reel is seated, a gripping portion located below the seating portion, and a trigger portion protruding downward in the gripping portion; and a movable hood coupled to the seat body so as to be movable along a central axis of the bore and fixing the fishing reel to the seating portion, wherein the gripping portion includes:

a first gripping surface portion configured to be gripped by an index finger;

a second gripping surface portion extending from the first gripping surface portion in a rearward direction;

a third gripping surface portion extending from the second gripping surface portion to the trigger portion so as to be inclined in an oblique direction between the rearward direction and a downward direction with respect to the central axis; and a fourth gripping surface portion extending from the third gripping surface portion so as to be inclined further than the third gripping surface portion in an oblique direction between the rearward direction and the downward direction with respect to the central axis and forming a front surface of the trigger portion, and wherein, in a side view of the seat body, the third gripping surface portion has a first inclined front end contour line formed as a straight line and inclined at a first inclination angle with respect to the central axis, and the fourth gripping surface portion has a second inclined front end contour line formed as a straight line, inclined with respect to the central axis at a second inclination angle greater than the first inclination angle, and connecting with the first inclined front end contour line.

2. The reel seat of claim 1, wherein the gripping portion includes a trigger boundary portion formed between the third gripping surface portion and the fourth gripping surface portion and inclined with respect to the central axis, and wherein the gripping portion is angularly bent through the trigger boundary portion such that the third gripping surface portion and the fourth gripping surface portion are divided from each other.

3. The reel seat of claim 1, wherein, in the side view of the seat body, the first inclined front end contour line and the second inclined front end contour line are inclined with respect to each other so as to form an included angle centered on a conjunction point of the third gripping surface portion and the fourth gripping surface portion.

4. The reel seat of claim 1, wherein the first inclination angle is in a range of 20 degrees to 30 degrees downward from the central axis, and the second inclination angle is in a range of 55 degrees to 70 degrees downward from the central axis.

5. The reel seat of claim 4, wherein the first inclined front end contour line is formed as a straight line having a length in a range of 12 mm to 20 mm.

6. The reel seat of claim 1, wherein the gripping portion further includes a fifth gripping surface portion located between the trigger portion and a rear end of the seat body, wherein the fifth gripping surface portion is configured to be gripped by a little finger moved from the fourth gripping surface portion, and wherein, in the side view of the seat body, the fifth gripping surface portion has a fourth lower end contour line formed as a straight line.

7. The reel seat of claim 6, wherein the fourth lower end contour line is formed as a straight line having a length in a range of 10 mm to 18 mm.

8. The reel seat of claim 6, wherein a first vertical distance between the central axis and a conjunction point of the first inclined front end contour line and the second inclined front end contour line is greater than a second vertical distance between the fourth lower end contour line and the central axis, and wherein the second vertical distance is greater than a third vertical distance between the central axis and a third lower end contour line of the second gripping surface portion.

9. The reel seat of claim 1, wherein the trigger portion includes a catching lower end portion connecting with the fourth gripping surface portion, and wherein the catching lower end portion is inclined with respect to the central axis at an inclination angle greater than the second inclination angle so as to support a little finger.

10. The reel seat of claim 9, wherein, in the side view of the seat body, the catching lower end portion has a vertical front end contour line perpendicular to the central axis and connecting with the second inclined front end contour line, and wherein, in a front view of the seat body, the catching lower end portion has a shape of an inverted triangle.

11. The reel seat of claim 1, wherein the second gripping surface portion includes a bite signal delivering portion configured to deliver a bite signal to a middle finger, and a bite signal boundary portion surrounding the bite signal delivering portion and dividing the bite signal delivering portion from the first gripping surface portion and the third gripping surface portion, and wherein the bite signal delivering portion is formed such that the seat body has a thickness less than both a thickness at the first gripping surface portion and a thickness at the third gripping surface portion.

12. The reel seat of claim 11, wherein, in the side view of the seat body, the bite signal delivering portion has a third lower end contour line formed as a straight line, and wherein, in a cross-sectional view of the seat body, the bite signal delivering portion has an outer peripheral contour line becoming a portion of a circumference line of an imaginary circle, which is located concentrically with an imaginary inscribed circle inscribed in the bore and has a radius greater than a radius of the imaginary inscribed circle.

13. The reel seat of claim 11, wherein the seat body has, at the bite signal delivering portion, a thickness in a range of 0.3 mm to 1.0 mm.

14. The reel seat of claim 1, wherein the seat body includes a cylindrical end portion extending from the seating portion and the first gripping surface portion along the central axis and coupled to the movable hood, wherein the first gripping surface portion includes:

a protruding surface portion located below the central axis and protruding in a radially outward direction of the central axis with respect to the cylindrical end portion; and a bulging surface portion extending rearward from the protruding surface portion and bulging in the radially outward direction, and wherein the movable hood includes:

a movable hood portion moved alongside an upper end edge of the protruding surface portion to be positioned above the protruding surface portion and fixing a portion of the fishing reel to the seating portion; and an accommodating portion formed as a space located below the movable hood portion and accommodating the protruding surface portion.

15. The reel seat of claim 14, wherein, in the side view of the seat body, the protruding surface portion of the first gripping surface portion has a first lower end contour line arcuately curved concavely with respect to the central axis, wherein, in the side view of the seat body, the bulging surface portion of the first gripping surface portion has a second lower end contour line arcuately curved convexly with respect to the central axis and connecting with the first lower end contour line, and wherein, in the side view of the seat body, the second gripping surface portion has a third lower end contour line connecting with the second lower end contour line and formed as a straight line.

16. A fishing rod comprising:

a rod body; and the reel seat of claim 1 coupled to the rod body.

* * * * *